(12) United States Patent
Yamazaki

(10) Patent No.: US 7,491,357 B2
(45) Date of Patent: Feb. 17, 2009

(54) SOLUTION CASTING PROCESS AND CELLULOSE ESTER FILM

(75) Inventor: Hidekazu Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 368 days.

(21) Appl. No.: 11/293,236

(22) Filed: Dec. 5, 2005

(65) Prior Publication Data

US 2006/0118996 A1    Jun. 8, 2006

(30) Foreign Application Priority Data

Dec. 3, 2004    (JP)    ............................. 2004-350704

(51) Int. Cl.
*B29C 49/08*    (2006.01)

(52) U.S. Cl. .................. 264/288.4; 264/290.2; 264/298

(58) Field of Classification Search ........................ None
See application file for complete search history.

(56) References Cited

U.S. PATENT DOCUMENTS 6,503,581 B1    1/2003    Shibue et al.
6,534,150 B1 *  3/2003    Yamanaka et al. .......... 428/143

OTHER PUBLICATIONS

JIII Journal of Technical Disclosure Monthly No. 2001-1745; Mar. 15, 2001.

* cited by examiner

*Primary Examiner*—Monica A Huson
(74) *Attorney, Agent, or Firm*—Sughrue Mion, PLLC

(57) ABSTRACT

In solution casting, dope containing a polymer and a solvent is cast on to a support to form a cast film. The cast film is stripped from the support to obtain a polymer film of cellulose ester, for example, cellulose acetate propionate (CAP). The polymer film is stretched. While the polymer film is stretched, tension of 80 N/m or more is applied thereto in a stretching direction. Polymer film surface temperature thereof is set equal to or more than a glass transition temperature Tg thereof. Furthermore, before stretching the polymer film, the polymer film stripped from the support is dried. After stretching the polymer film, the polymer film is dried. Also, the solution casting process is according to multi casting of plural dopes at one time together for plural cast films in the polymer film.

10 Claims, 2 Drawing Sheets

SOLUTION CASTING PROCESS AND CELLULOSE ESTER FILM

BACKGROUND OF THE INVENTION

1. Field of the Invention

The present invention relates to a solution casting process and cellulose ester film. More particularly, the present invention relates to a solution casting process capable of producing a polymer film with high optical performance, and cellulose ester film produced by the process.

2. Description Related to the Prior Art

Cellulose acylates are used as a support of polymer film contained in photosensitive materials, such as photographic films, owing to advantageous characteristics, for example rigidity, non-flammability, and the like. A typical example of cellulose acylate is cellulose triacetate (TAC) having an average acetylation degree of 57.5-62.5%. Also, the polymer film of the cellulose triacetate (TAC) is used as a protection film of a polarizer, or an optical compensation film (view angle enlarging film or the like), any of those being incorporated in a liquid crystal display (LCD) panel. This is effective because of optically utilizing the highly isotropic property of the polymer film.

A solution casting is a widely used method of producing polymer film of the cellulose triacetate (TAC). The solution casting is capable of producing a base film of photosensitive material or transparent sheet on a liquid crystal display panel. A process of producing polymer film of cellulose triacetate (TAC) is typically disclosed in JIII Journal of Technical Disclosure Monthly (Japan Hatsumei Kyokai, Kokai Giho), No. 2001-1745. At first, cellulose triacetate (TAC) is dissolved in a mixed solvent of which a main component is dichloro methane, to prepare dope or polymer solution. After this, the dope is cast on a support, for example a band-shaped support or rotatable drum-shaped support, to form cast film. When the cast film dries to have a self-supporting property, a self-supporting cast film is stripped by a stripping roller. The cast film is sufficiently dried and cooled, and wound as a roll of the polymer film.

U.S. Pat. No. 6,503,581 (corresponding to JP-A 2001-188128) discloses the use of a different from the cellulose triacetate (TAC) for the purpose of enlarging durability against moist and heat. According to the patent document, cellulose acetate propionate (CAP) is produced by acylation of an acetyl group ($—CO—CH_3$) and acylation of a propionyl group ($—CO—C_2H_5$). The cellulose acetate propionate (CAP) is used as one raw material of the polymer film. The cellulose acetate propionate (CAP) contains a longer acyl group at side chains than that of the cellulose triacetate (TAC), and characteristically has a higher lipophilic property and a lower hydrophilic property. Solubility of the cellulose acetate propionate (CAP) in organic solvents can be higher. Preparation of a dope from the cellulose acetate propionate (CAP) can be easier.

The polymer film formed from the cellulose acetate propionate (CAP) has an advantage in high durability against moist and heat because of a hydrophobic characteristic of a side chain of the acyl group contained in the cellulose acetate propionate (CAP). Also, the cellulose acetate propionate (CAP) in the polymer film contains a propionyl group. Orientation of molecules of the cellulose acetate propionate (CAP) can easily occur because of readiness in exertion of intermolecular force between its molecules. Thus, a high value of retardation Re in the in-plane direction of the polymer film can be obtained by the cellulose acetate propionate (CAP). A high value of retardation Rth in the thickness direction of the polymer film can be obtained. The cellulose acetate propionate (CAP) is effectively used as optical film in the liquid crystal display (LCD) panel of a vertical alignment (VA) type in which optical compensation is required.

There is a technique of reducing a value of a cell gap which is an interval between base plates of glass for squeezing molecules of the liquid crystal. This is for the purpose of quick response in the liquid crystal display (LCD) panel. A high value of the retardation Re in the in-plane direction can be obtained and is advantageous in view of the optical compensation. However, the retardation Rth in the thickness direction will be considerably high in the manner of the retardation Re in the in-plane direction, and too high in consideration of the cell gap, to result in lowering a quality of imaging of the liquid crystal display (LCD) panel. The casting according to the above patent document is conditioned in the same manner as when the cellulose triacetate (TAC) is used as a raw material. There remains a problem in too high values of both of the retardation Re in the in-plane direction and the retardation Rth in the thickness direction.

In considering the disclosure of U.S. Pat. No. 6,503,581 (corresponding to JP-A 2001-188128), the number of carbon atoms contained in a substitution group of acylation can be higher. Conceivable examples of such acyl groups are butyryl (butanoyl) group ($—CO—C_3H_7$), pentanoyl group ($—CO—C_4H_9$) and hexanoyl group ($—CO—C_5H_{11}$). Those examples have a longer side chain than that of the acetyl group, so that tendency of occurrence of intermolecular force of the polymeric molecules will be relatively high. The polymer film, if produced from raw material containing cellulose esters having the substitution group of any of those, will have high orientation. The polymer film will be suitable as a phase difference film, because of highness of the retardation Re in the in-plane direction and the retardation Rth in the thickness direction. However, a serious problem may arise in difficulty in the casting due to differences in the characteristics from the cellulose triacetate (TAC), as a result of an experiment under the same condition as the cellulose triacetate (TAC). Also, the value of the retardation Rth in the thickness direction may be too high, so the use of the polymer film is considerably difficult as a phase difference film.

SUMMARY OF THE INVENTION

In view of the foregoing problems, an object of the present invention is to provide a solution casting process capable of producing a polymer film with high optical performance, and cellulose ester film produced by the process.

In order to achieve the above and other objects and advantages of this invention, a solution casting process is provided, in which dope containing a polymer and a solvent is cast on to a support to form a cast film, the cast film is stripped from the support to obtain a polymer film, and the polymer film is stretched. The solution casting process includes a step of, while the polymer film is stretched, applying tension of 80 N/m or more thereto in a stretching direction, wherein polymer film surface temperature thereof is set equal to or more than a glass transition temperature Tg thereof.

The polymer is constituted by a cellulose ester, and satisfies conditions of:

$$2.5 \leq A+B \leq 3.0 \qquad \text{I}$$

$$1.25 \leq B \leq 3.0 \qquad \text{II}$$

where A and B are a degree of substitution of an acyl group formed by substituting a hydrogen atom in hydroxy groups in cellulose, and A is a degree of substitution of an acetyl group formed by substituting a hydrogen atom in the hydroxy groups in the cellulose, and B is a total degree of substitution of at least one of a propionyl group, a butyryl group, a pentanoyl group, and a hexanoyl group formed by substituting a hydrogen atom in the hydroxy groups in the cellulose.

The polymer film is stretched to have a first retardation Rth (nm) in a film thickness direction thereof, and a second retardation Re (nm) in a film in-plane direction thereof. The first retardation Rth is equal to or more than 30 nm and equal to or less than 500 nm, the second retardation Re is more than 0 nm and equal to or less than 200 nm, and a ratio Rth/Re defined between is equal to or less than 4.0.

Preferably, the tension is equal to or more than 80 N/m and equal to or less than 5,000 N/m.

Preferably, the polymer film surface temperature is set equal to or more than (Tg+1) deg. Centigrade and equal to or less than (Tg+30) deg. Centigrade, where Tg is the glass transition temperature.

Preferably, the cellulose ester satisfies a condition of:

$$1.3 \leq B \leq 2.97.$$

Furthermore, before stretching the polymer film, the polymer film stripped from the support is dried. After stretching the polymer film, the polymer film is dried.

Furthermore, the polymer film stripped from the support is dried, by blowing dry gas of temperature equal to or more than 20 deg. Centigrade and equal to or less than 250 deg. Centigrade thereto.

The solution casting process is according to any one of multi casting of two or more dopes at one time together for two or more cast films in the polymer film, and multi casting of two or more dopes sequentially one after another for two or more cast films in the polymer film.

The solution casting process is according to multi casting of two or more dopes at one time together for two or more cast films in the polymer film. A thickness of one of the cast films positioned on an air surface side, and/or a thickness of one of the cast films positioned on a supported side of the support, is equal to or more than 0.5% of and equal to or less than 30% of a total thickness of the two or more cast films.

The support is a band-shaped or drum-shaped support, and a surface temperature thereof is equal to or more than −20 deg. Centigrade and equal to or less than 40 deg. Centigrade.

According to another aspect of the invention, a cellulose ester film is provided, produced by steps of casting dope on to a support to form a cast film, the dope containing a cellulose ester and a solvent, and stripping the cast film from the support, and stretching the cast film. The cellulose ester film has a first retardation Rth (nm) in a film thickness direction, and a second retardation Re (nm) in a film in-plane direction. The first retardation Rth is equal to or more than 30 nm and equal to or less than 500 nm, the second retardation Re is more than 0 nm and equal to or less than 200 nm, and a ratio Rth/Re defined between is equal to or less than 4.0.

The cellulose ester satisfies conditions of:

$$2.5 \leq A+B \leq 3.0 \qquad \text{I}$$

$$1.25 \leq B \leq 3.0 \qquad \text{II}$$

where A and B are a degree of substitution of an acyl group formed by substituting a hydrogen atom in hydroxy groups in cellulose, and A is a degree of substitution of an acetyl group formed by substituting a hydrogen atom in the hydroxy groups in the cellulose, and B is a total degree of substitution of at least one of a propionyl group, a butyryl group, a pentanoyl group, and a hexanoyl group formed by substituting a hydrogen atom in the hydroxy groups in the cellulose.

The cellulose ester film is formed by stretching with tension of 80 N/m or more applied thereto in a stretching direction, and cellulose ester film surface temperature thereof is set equal to or more than a glass transition temperature Tg thereof.

The cast film is constituted by two or more cast films overlaid on one another, and formed by any one of multi casting of two or more dopes at one time together for two or more cast films in the polymer film, and multi casting of two or more dopes sequentially one after another for two or more cast films in the polymer film.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

[Raw Materials]

Figure 1:
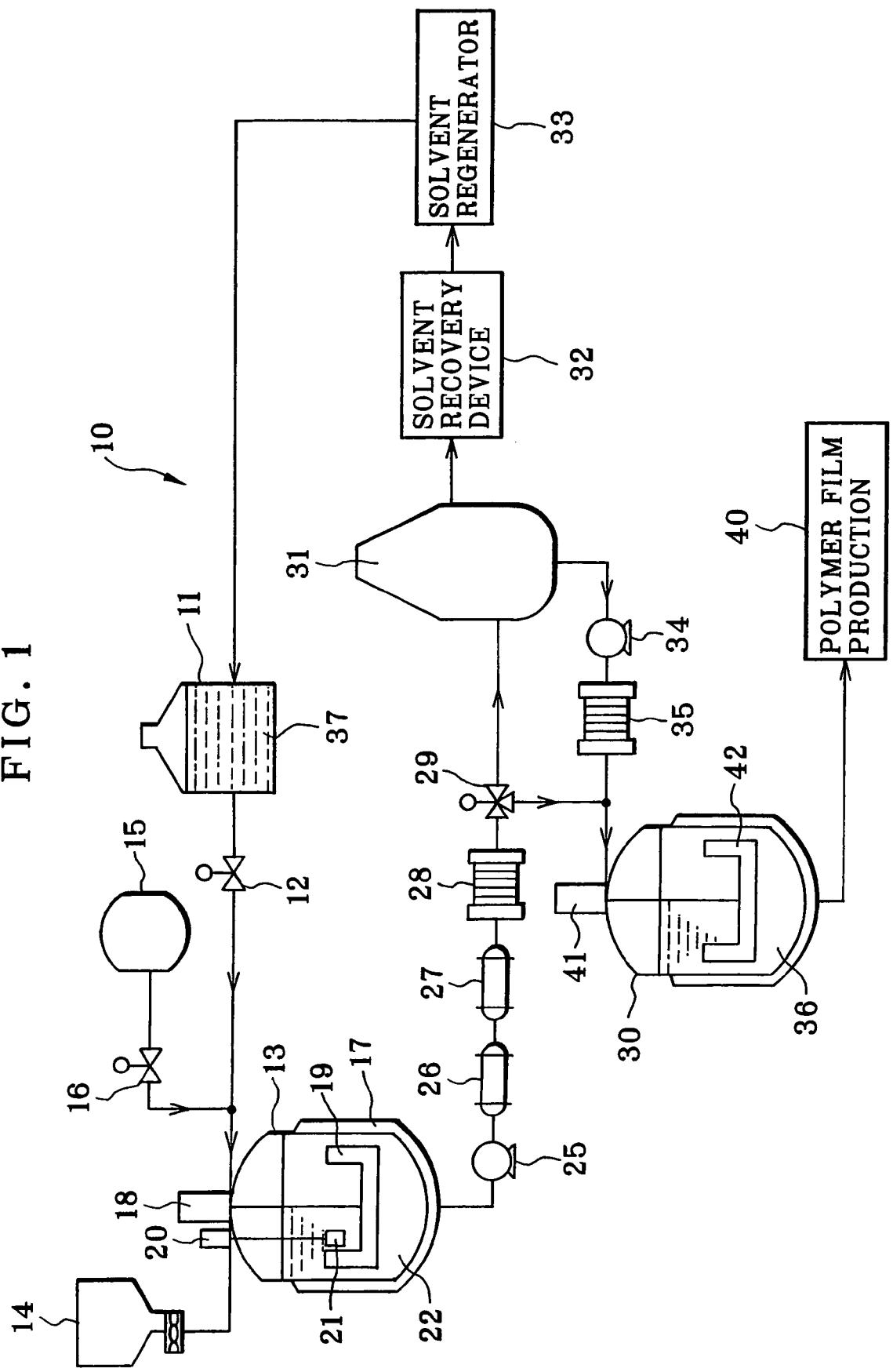
FIG. 1 is a structural view schematically illustrating a dope producing system.

Polymers used in the present invention are cellulose esters. Preferable examples of cellulose esters satisfy conditions I and II as follows:

$$2.5 \leq A+B \leq 3.0 \qquad \text{I}$$

$$1.25 \leq B \leq 3.0 \qquad \text{II}$$

where A and B represent a degree of substitution of an acyl group (—CO—R) formed by substituting hydroxy groups in cellulose. A represents a degree of substitution of an acetyl group (—CO—$CH_3$) formed by substituting hydroxy groups in cellulose. B represents a total degree of substitution of a propionyl group (—CO—$C_2H_5$), a butyryl (butanoyl) group (—CO—$C_3H_7$), a pentanoyl group (—CO—$C_4H_9$) and a hexanoyl group (—CO—$C_5H_{11}$) formed by substituting hydroxy groups in cellulose.

Note that a term CAP (cellulose acetate propionate) is used for the polymer in which the acyl group with the value B is a propionyl group. A term CAB (cellulose acetate butyrate) is used for the polymer in which the acyl group with the value B is a butyryl (butanoyl) group. Further to the condition II, the value B is preferably in a range of $1.3 \leq B \leq 2.97$, and desirably in a range of $1.4 \leq B \leq 2.97$.

In the cellulose, three hydroxy groups are contained in a unit of one glucose. Any value of the degree of acyl substitution is relative to the number 3.0 of the hydroxy group. Namely, the highest value of the degree of acyl substitution is 3.0.

According to a preferred embodiment, any raw material of the CAP and CAB should include 90 wt. % or more of particles of 0.1-4 mm.

Examples of solvents for preparing the dope include:

aromatic hydrocarbons, such as benzene and toluene;

halogenated hydrocarbons, such as dichloromethane and chlorobenzene;

alcohols, such as methanol, ethanol, n-propanol, n-butanol, and diethylene glycol;

ketones, such as acetone and methyl ethyl ketone;

esters, such as methyl acetate, ethyl acetate, and propyl acetate;

ethers, such as tetrahydrofuran and methyl cellosolve.

Preferable halogenated hydrocarbons for use contain 1-7 carbon atoms. Among those, dichloromethane is desirable. It is preferable in a mixed solvent to mix one or more alcohols containing 1-5 carbon atoms with the dichloromethane, for the purpose of high solubility, easy separability from a support for casting, mechanical strength of film material, various optical characteristics of a cellulose ester. Such alcohols are contained in the mixed solvent preferably in a range of 2-25 wt. %, and desirably in a range of 5-20 wt. %. Preferable examples of alcohols are methanol, ethanol, n-propanol, iso-propanol, n-butanol and the like. Among those, specifically preferable substances are methanol, ethanol, n-butanol, and mixture of two or more of them.

Solvents not containing dichloromethane are effectively used in the publicly suggested manner, for the purpose of minimizing influence to environment. Examples of compounds useful to this end are ethers having 4-12 carbon atoms, ketones having 3-12 carbon atoms, and esters having 3-12 carbon atoms, among which methyl acetate is specifically preferable. Two or more compounds can be mixed as mixed solvents. Ethers, ketones and esters may have a cyclic structure. Compounds having two or more functional groups of ethers, ketones and esters, namely —O—, —CO— and —COO—, can be used as a solvent. A solvent can contain other functional groups, for example an alcoholic hydroxy group. A solvent, in case of containing two or more functional groups, should have the number of carbon atoms equal to or lower than an upper limit associated with a compound with any one functional group.

Details of cellulose esters are according to various relevant techniques. Those examples and their various features can be used in the present invention. Uses of various materials in relation to those have been suggested, including solvents, plasticizers, degradation retardant, ultraviolet (UV) absorbers, optical anisotropy control agents, dyes, matte agents, release agents, retardation control agents, and other additives.

A cellulose ester of the invention can be a cellulose acylate. Examples of acyl groups in cellulose acylates having two or more carbon atoms can be aliphatic groups, aryl groups, and the like. For example, cellulose esters may be alkyl carbonyl esters, alkenyl carbonyl esters, aromatic carbonyl esters, aromatic alkenyl carbonyl esters, and the like of cellulose, and can further contain a substitution group. Preferable examples of groups include: propionyl, butanoyl, pentanoyl, hexanoyl, octanoyl, decanoyl, dodecanoyl, tridecanoyl, tetradecanoyl, hexadecanoyl, octadecanoyl, iso-butanoyl, tert-butanoyl, cyclohexane carbonyl, oleoyl, benzoyl, naphthyl carbonyl, and cinnamoyl. Among those, particularly preferable groups are propionyl, butanoyl, dodecanoyl, octadecanoyl, tert-butanoyl, oleoyl, benzoyl, naphthyl carbonyl, and cinnamoyl. Further, specifically preferable groups are propionyl and butanoyl.

Examples of acyl groups in cellulose acylates can be aliphatic groups, aryl groups, and the like. For example, cellulose esters may be alkyl carbonyl esters, alkenyl carbonyl esters, aromatic carbonyl esters, aromatic alkenyl carbonyl esters, and the like of cellulose, and can further contain a substitution group. The total of carbon atoms in each ester group should be 22 or less. Preferable examples of groups have such a structure that the total of the carbon atoms of each ester is 22 or lower, and thus include: acyl groups (such as acetyl, propionyl, butyroyl, valeroyl, heptanoyl, octanoyl, decanoyl, dodecanoyl, tridecanoyl, hexadecanoyl, and octadecanoyl), allyl carbonyl groups (such as acryl and meth-acryl), aryl carbonyl groups (such as benzoyl and naphthaloyl), and a cinnamoyl group. Specifically, preferable esters include cellulose acetate, cellulose acetate propionate, cellulose acetate butyrate, cellulose acetate stearate, and cellulose acetate benzoate. Esters can be mixed as mixture, of which any ratio of mixture can be used. However, 30 mol % or more of acetate can be preferably contained in the total of mixed ester.

I. Specific Examples of Cellulose Acylates

Suggested in JP A 10-45803 (corresponding to U.S. Pat. No. 5,856,468), JP A 11-269304 (corresponding to U.S. Pat. No. 6,139,785), JP A 8-231761, JP A 10-60170, JP A 9-40792, JP A 11-5851, JP A 9-90101, JP A 57-182737 (corresponding to U.S. Pat. No. 4,499,043), JP A 4-277530, JP A 11-292989, JP A 2000-131524, and JP A 2000-137115.

II. Specific Examples of Solvents for Esters and their dissolution

Suggested in JP A 2000-95876, JP A 2000-95877, JP A 10-324774, JP A 8-152514, JP A 10-330538, JP A 9-95538, JP A 9-95557, JP A 10-235664, JP A 2000-63534, JP A 11-21379, JP A 10-182853, JP A 10-278056, JP A 10-279702, JP A 10-323853, JP A 10-237186, JP A 11-60807, JP A 11-152342, JP A 11-292988, and JP A 11-60752.

III. Plasticizers

Suggested in JP A 5-194788, JP A 60-250053, JP A 4-227941, JP A 6-16869, JP A 5-271471, JP A 7-286068, JP A 5-5047, JP A 11-80381, JP A 7-20317, JP A 8-57879, JP A 10-152568, and JP A 10-120824.

IV. Degradation Retardants and UV Absorbers

Suggested in JP A 60-235852, JP A 3-199201, JP A 5-190707, JP A 5-194789, JP A 5-271471, JP A 6-107854, JP A 6-118233, JP A 6-148430, JP A 7-11055, JP A 7-11056, JP A 8-29619, JP A 8-239509 (corresponding to U.S. Pat. No. 5,806,834), JP A 2000-204173, JP A 5-197073, and JP A 2000-193821.

[Production of Dope]

In FIG. 1, a dope producing system 10 is illustrated. A solvent tank or reservoir 11 stores solvent. A valve 12 is connected with the solvent reservoir 11, and opens for delivery of the solvent, with which a dissolving tank or reservoir 13 is supplied. A hopper 14 stores CAP, which is delivered into the dissolving tank 13 at an amount measured in a monitored manner. Note that any cellulose ester can be used in place of the CAP according to the invention. An additive tank or reservoir 15 stores an additive. A valve 16 is connected with the additive reservoir 15, and opened and closed to pour solution of the additive to the dissolving tank 13. Note that it is possible to deliver an additive to the dissolving tank 13 in a normally liquid phase at a room temperature, unlike the phase of the solution of the solid additive in a solvent. Furthermore, if an additive is solid at a room temperature, the additive can be delivered to the dissolving tank 13 by use of a hopper for the solid additive. If a plurality of additives are used to be poured, it is possible for the additive reservoir 15 to store mixed solution of plural additives in a solvent. Also, a multi conduit delivery can be used, in which a plurality of additive reservoirs are used for storing solutions of additives in solvents, and plural conduits are connected for delivery of the additive solutions to the dissolving tank 13.

According to the above description, the process of delivery to the dissolving tank or reservoir 13 is in a sequence of solvent or mixed solvent, CAP and then additive. However, the process can be according to a sequence different from this. It is possible to pour solvent of a preferred amount after measuring and delivering the CAP to the dissolving tank 13. Furthermore, additives may not be prepared in the dissolving tank 13 initially. It is possible in subsequent steps to mix additives to a composition containing CAP and solvent. Note that this composition can be also referred to as dope.

A jacket 17 is disposed about the dissolving tank or reservoir 13. There is a first stirring blade or anchor stirrer 19, which a motor 18 drives for rotations. Preferably, a second stirring blade or dissolver stirrer 21 is used, which a motor 20 drives for rotations. The anchor stirrer 19 and the dissolver stirrer 21 may be replaced by any suitable type of stirring blade. Heat exchange medium is preferably caused to flow through the jacket 17, to condition the dissolving tank 13 thermally in a range from −10 to 55 deg. Centigrade. A swollen liquid 22 can be obtained by selectively driving the anchor stirrer 19 and the dissolver stirrer 21, the swollen liquid 22 containing the solvent and the CAP swollen in the solvent.

A heater 26 is provided with the swollen liquid 22 by a pump 25. It is preferable that conduits with a jacket are incorporated in the heater 26. Also, a structure for pressurizing the swollen liquid 22 is associated with the heater 26. A dope is obtained by use of the swollen liquid 22 conditioned in application of heat or application of pressure and heat, and by dissolving CAP or other solute in a solvent. During the dissolution, the swollen liquid 22 should be kept at a temperature of 0-97 deg. Centigrade. Also, a process of cooling dissolution can be used, in which the swollen liquid 22 is cooled at a temperature between −10 and −100 deg. Centigrade. The CAP can be dissolved in the solvent sufficiently by suitable selection of the thermal dissolution and cooling dissolution. A temperature adjuster 27 conditions the dope at the room temperature. A filtration device 28 filtrates the dope to eliminate impurity. In the filtration device 28, a filter has a preferable pore diameter of which an average is 100 microns or less. A filtration flow rate is preferably 50 liters/mm$^2$.hr or more. A storing tank or reservoir 30 is provided with the dope being filtrated. A valve 29 is opened and closed to cause the dope to flow to the tank 30.

The dope can be used for solution casting to form a polymer film. However, dissolution of the CAP after preparing the swollen liquid 22 causes a problem in long time typically required for high target density of the CAP, and in high cost. In view of this, a dope of a low density can be preferably prepared at first in comparison with the target density, before condensation is made for preparing the dope at the higher target density. A flushing machine 31 is supplied by the valve 29 with the dope filtrated by the filtration device 28. Part of the solvent in the dope is evaporated in the flushing machine 31. A solvent recovery device 32 is connected with the flushing machine 31. The solvent in the gas phase is liquefied by a condenser (not shown), and collected by the solvent recovery device 32. A solvent regenerator 33 is supplied with the collected solvent, and regenerates a solvent ready for use in preparing the dope. The use of the solvent regenerator 33 is effective in reducing the manufacturing cost.

After the condensation, a pump 34 is used to remove the dope from the flushing machine 31. Also, bubbles can be preferably eliminated from the dope. Any known defoaming methods can be used for removing bubbles, for example, ultrasonic defoaming. After this, a filtration device 35 is supplied with the dope, and removes particles or other foreign materials from the dope. In the filtration device 35, the temperature of the dope can be preferably kept at 0-200 deg. Centigrade. Then the dope is poured and stored into the storing tank or reservoir 30.

According to the above embodiment, a dope containing CAP at a density of 5-40% is obtained. A dope 36, namely raw material dope, is stored in the tank 30.

In a solution casting process to produce a cellulose ester film, various techniques of dissolution of materials and additives, filtration, elimination of bubbles, mixing of additives can be used. The features can be combined with the present invention. Details of those are according to various techniques.

No. 1. Dissolution Related to Casting

Suggested in JP A 9-95544 (corresponding to U.S. Pat. No. 5,663,310), JP A 10-95854 (corresponding to U.S. Pat. No. 5,783,121), JP A 10-45950, and JP A 2000-53784.

No. 2. Specific Preparing Methods of Solutions

Suggested in JP A 2000-273184, JP A 11-310640 (corresponding to U.S. Pat. No. 6,211,358), JP A 11-323017, and JP A 11-302388.

No. 3. Condensation of Solutions

Suggested in JP A 4-259511; U.S. Pat. Nos. 2,541,012, 2,858,229, 4,414,341, and 4,504,355.

[Solution Casting Process]

Figure 2:
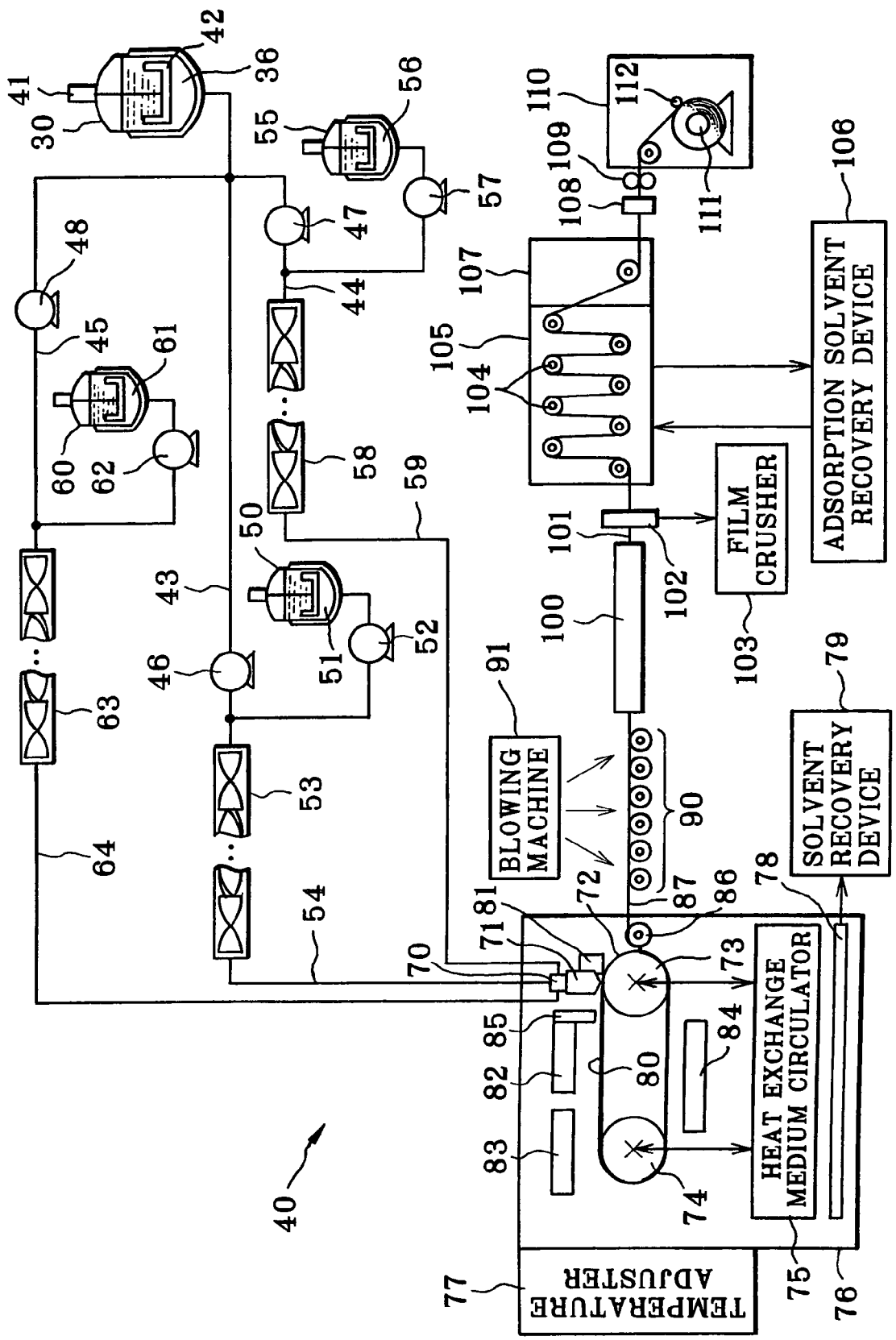
FIG. 2 is a structural view schematically illustrating a polymer film producing system in connection with the dope producing system.

In FIG. 2, a polymer film producing system 40 is illustrated. A stirring blade or anchor stirrer 42 is incorporated in the storing tank or reservoir 30. A motor 41 rotates the anchor stirrer 42. The anchor stirrer 42 stirs the dope 36 when driven by the motor 41, to keep uniformity of the dope 36. Three dope conduits are connected with the tank 30, which are a core layer dope conduit 43, a first dope conduit 44, and a second dope conduit 45. Gear pumps 46, 47 and 48 are associated with the dope conduits 43, 44 and 45, and cause the dope 36 to flow. A feed block 70 causes convergence of the dope 36 from the dope conduits 43-45. A casting support band 72 is a support for film forming under the feed block 70. A casting die 71 casts bead of the dope 36 on to the casting support band 72. Note that the casting die 71 can be a multi manifold die for a multi casting.

For a core layer dope, there is a storing tank or reservoir 50. A liquid additive 51 is stored in the tank 50. A pump 52 is connected with the tank 50, and delivers the liquid additive 51. The liquid additive 51 flows into the core layer dope conduit 43 and mixed with the dope 36. After the mixing operation, a static mixer 53 stirs and mixes the mixed liquid, to create dope in a uniform state. This dope is hereinafter called a core layer dope 54. The liquid additive 51 consists of solutions or dispersions containing additives which may be ultraviolet absorber, retardation control agent and the like.

For a supported surface dope, there is a storing tank or reservoir 55. A liquid additive 56 is stored in the tank 55. A pump 57 is connected with the tank 55, and delivers the liquid additive 56. The liquid additive 56 flows into the first dope conduit 44 and mixed with the dope 36. After the mixing operation, a static mixer 58 stirs and mixes the mixed liquid, to create dope in a uniform state. This dope is hereinafter called a supported surface dope or first dope 59. The liquid additive 56 consists of solutions or dispersions containing additives which include a release agent, for example a citrate ester, for facilitating stripping from the supporting band, and a matte agent, for example silicon dioxide, for suppression tight adhesion of layers of polymer film. Also, the liquid additive 56 may include a plasticizer, ultraviolet absorber and the like.

For an air surface dope, there is a storing tank or reservoir 60. A liquid additive 61 is stored in the tank 60. A pump 62 is connected with the tank 60, and delivers the liquid additive 61. The liquid additive 61 flows into the second dope conduit 45 and mixed with the dope 36. After the mixing operation, a static mixer 63 stirs and mixes the mixed liquid, to create dope in a uniform state. This dope is hereinafter called an air surface dope or second dope 64. The liquid additive 61 consists of solutions or dispersions containing additives which include a matte agent, for example silicon dioxide, for suppressing tight adhesion of layers of polymer film. Also, the liquid additive 61 may include a release agent, plasticizer, ultraviolet absorber and the like.

The feed block 70 is supplied with the dopes 54, 59 and 64 at their predetermined target amounts. The feed block 70 converges the dopes, which the casting die 71 casts on to the casting support band 72.

Preferable materials of the casting die 71 can be stainless steel of a type of precipitation hardening. The material can have a coefficient of thermal expansion of $2 \times 10^{-5}$ (/deg. Centigrade) or less. Desirably, a corrosion resistance of the material should be equal to that of SUS 316 steel according to forced corrosion test in electrolytic aqueous solution. Also, the material of the casting die 71 has the corrosion resistance sufficient for prevention of pitting on the gas-liquid interface even after dipping in a liquid mixture of dichloromethane, methanol and water for three (3) months. The casting die 71 is created by cutting and scraping a steel block which has been preserved for one (1) month or more after being molded. This preservation is effective in regularizing a surface condition of the dope flowing in the casting die 71. Surfaces of the casting die 71 and the feed block 70 to contact the liquid are formed with precision to have a surface roughness of 1 micron or less, and a degree of straightness of 1 micron per meter or less in any direction. A clearance of the die slot is adjustable in a range of 0.5-3.5 mm by an automated structure. Preferable corner portions at the end of the die lip to contact the liquid are shaped so as to set a radius of curvature R at 50 microns or less in the whole width of the slot. A preferable shear rate inside the die is in a range of 1-5,000 (1/sec).

A casting width of the casting die 71 may not be limited to a certain size. A preferable casting width of the casting die 71 can be preferably 1.1-2.0 times as much as a web width of the polymer film as a final product. A temperature adjuster, for example a heater or jacket, is preferably used in the course of casting in order to maintain a predetermined temperature. The casting die 71 is preferably a coat hanger type. Thickness adjusting die bolts or heat bolts can be arranged at a given pitch, and are preferably adapted to automatic adjustment of the thickness. The die bolts are constructed to set up a profile according to a flow amount of the gear pumps 46-48 by a stored program. Also, an infrared thickness meter (not shown) can be installed in the polymer film producing system 40, for feedback control according to an adjusting program based on the profile of the infrared thickness meter. A difference between any two points which are on the polymer film, except for the die edges for the casting, is preferably equal or less than 1 micron. The greatest difference between minimum values of the thickness in the width direction is preferably set equal to or less than 3 microns. Precision in the thickness is preferably so determined that an average error in the thickness of the cast film is equal to or less than 1.5 microns.

A hardened layer or case can be preferably formed on the end of the lip of the die. Various methods for forming the hardened layer or case can be used, including application of a ceramic coating, a hard chromium plating, and processing of nitriding. In case of using the ceramic coating, the material of the ceramic coating should have suitability for grinding, low porosity, low fragility, high resistance to corrosion, suitability for adhesion to the casting die 71, and property free from adhesion to dope. Specifically, WC (tungsten carbide), $Al_2O_3$, TiN, $Cr_2O_3$ and the like can be used, among which WC is particularly preferable. A thermal spray process can be used for applying a WC coating.

Various preferable structures can be used. Specifically, a solvent delivery device (not shown) can be connected to an end of the die slot of the casting die 71 for the purpose of preventing drying and local solidification of dope at the end of the die slot. A solvent for imparting solubility to the dope can be supplied to a gas-liquid interface between an end of the casting bead and the die slot. An example of the solvent can be a mixed solvent containing 86.5 parts by weight of dichloromethane, 13 parts by weight of acetone, and 0.5 part by weight of n-butanol. The mixed solvent should be delivered to each of two slot ends at a range of 0.02-1.0 ml/min for the purpose of preventing existence of foreign materials in the cast film. A pump for delivering the mixed solvent should have a fluctuation ratio of 5% or lower.

There are rotating rolls 73 and 74 between which the casting support band 72 extends for turning under the casting die 71. The casting support band 72 circulates endlessly by rotations of the rotating rolls 73 and 74. A preferable range of a casting speed, namely a moving speed of the casting support band 72 is 10-200 m/min. A heat exchange medium circulator 75 should be preferably associated with the rotating rolls 73 and 74 for controlling a surface temperature of the casting support band 72. A preferable range of the surface temperature of the casting support band 72 is from −20 to 40 deg. Centigrade. A flow conduit for a heat exchange medium is formed through the rotating rolls 73 and 74, and keeps the rotating rolls 73 and 74 at a target temperature by flow of the heat exchange medium at a prescribed temperature.

A width of the casting support band 72 may not be limited to a certain size. A preferable width of the casting support band 72 can be preferably 1.1-2.0 times as much as a casting width of the dopes 54, 59 and 64. A length of the casting support band 72 is preferably 20-200 meters. A thickness of the casting support band 72 is 0.5-2.5 mm. A surface roughness of the casting support band 72 is 0.05 micron or less owing to polishing the band surface. The material of the casting support band 72 is preferably SUS 316, and has sufficient strength and resistance to corrosion. Irregularity of the thickness of the casting support band 72 is preferably 0.5% or less.

Tension which occurs in the casting support band 72 in rotation of the rotating rolls 73 and 74 for driving should be controlled and regulated at a level of $1.5 \times 10^4$ kg/m. A difference in the speed between the casting support band 72 and the rotating rolls 73 and 74 can be regulated at 0.01 m/min or less. A fluctuation in the speed of the casting support band 72 can be kept 0.5% or less. A zigzag movement of the casting support band 72 in the band width direction can be limited to 1.5 mm or less during one turn of the casting support band 72. To control the zigzag movement, an edge detector (not shown) for detecting band edges of the casting support band 72 can be used, for the purpose of feedback control according to measured information of the detection. Also, an under-die portion of the casting support band 72 directly under the casting die 71 can be kept from moving beyond a range of 200 microns in a vertical direction while the rotating roll 73 rotates.

The rotating rolls 73 and 74 can be a drum-shaped support for casting in place of the casting support band 72. It is preferable to rotate the rotating rolls 73 and 74 with such high precision that fluctuation of rotations is as small as 0.2 mm or lower. An average surface roughness of the rotating rolls 73 and 74 can be 0.01 micron or less. Thus, the rotating rolls 73 and 74 are finished by chrome plating or the like for imparting sufficient hardness and durability. It is necessary to minimize the surface defects of the support which may be the casting support band 72 or the rotating rolls 73 and 74. Specifically, an amount of a pinhole in a size of 30 microns or more should be zero. An amount of a pinhole in a size equal to or more than 10 microns and less than 30 microns should be one (1) or less per sq. meter. An amount of a pinhole in a size less than 10 microns should be two (2) or less per sq. meter.

A casting chamber 76 is installed to accommodate the casting die 71 and the casting support band 72. A temperature adjuster 77 maintains the temperature inside the casting chamber 76 at a prescribed level. A preferable range of the prescribed temperature is from −10 to 57 deg. Centigrade. A condenser 78 is provided and condenses and collects the solvent from the content in the gas phase. A solvent recovery device 79 collects and regenerates the condensed solvent in the liquid phase, and delivers the solvent for preparing dope.

The dopes 54, 59 and 64 are cast by the casting die 71 on to the casting support band 72 in forming a casting bead from the dopes. So a cast film 80 is formed. Temperature of each of those dopes is preferably from −10 to 57 deg. Centigrade. There is a decompressing chamber 81 located on the rear surface of the casting bead for stabilizing the forming of the casting bead, to regulate the pressure at a predetermined level. A rear surface of the bead can be decompressed with a pressure difference of 5-1,000 Pa from a pressure to the bead front surface. Also, a jacket (not shown) is preferably secured to keep the decompressing chamber 81 at a prescribed temperature. A preferable temperature of the decompressing chamber 81 is 25-55 deg. Centigrade. Also, a suction device (not shown) is associated with the edge portion of the casting die 71 for shaping the casting bead in an intended form. A flow rate of the suction on the edge is preferably 1-100 liters per minute.

The cast film 80 moves together with the casting support band 72. Gas flow ducts 82, 83 and 84 are preferably disposed for evaporating solvent in the cast film 80 by blowing air or other gas. The gas flow duct 82 is disposed higher than the casting support band 72 and on the upstream side. The gas flow duct 83 is disposed higher than the casting support band 72 and on the downstream side. The gas flow duct 84 is disposed lower than the casting support band 72. A gas blocking panel or device 85 is associated for blocking excessive flow of dry gas, in order to suppressing changes in the quality of the film surface in blowing of dry gas to the cast film 80. Note that a drum-shaped support or other supporting structure can be used in place of the casting support band 72 for casting. A surface temperature of the casting support band 72 or the drum-shaped support is preferably in a range from −20 to 40 deg. Centigrade.

A stripping roll 86 supports and strips the cast film 80 from the casting support band 72 after creation of a self-supporting property. A self-supporting cast film 87 is obtained as a stripped form of the cast film 80. A transfer assembly 90 having a series of rollers transfers the self-supporting cast film 87 from the stripping roll 86. A tentering machine 100 is supplied with the self-supporting cast film 87 from the transfer assembly 90. Note that a blowing machine 91 blows dry gas of a predetermined temperature to the self-supporting cast film 87 at the transfer assembly 90, to promote drying of the self-supporting cast film 87. A preferable temperature of the dry gas is in a range of 20-250 deg. Centigrade. It is also possible in the transfer assembly 90 to rotate one or more specific rollers faster than rollers that are upstream from the specific rollers, for the purpose of stretching the self-supporting cast film 87 in the casting direction.

The self-supporting cast film 87 is fed and dried in the tentering machine 100 while its web edges are retained by tenter clips. It is possible to define plural temperature zones in the tentering machine 100 for conditioning the drying operation by plural temperatures different from one another. Also, the self-supporting cast film 87 can be stretched and loosened by the tentering machine 100 in the web width direction of the self-supporting cast film 87. Stretching and loosening makes it possible to create the self-supporting cast film 87 with desired modifications of optical characteristics. Also, it is possible in at least one of the transfer assembly 90 and the tentering machine 100 to stretch the self-supporting cast film 87 at a ratio of 0.5-300% in at least one of the casting direction and the web width direction.

The self-supporting cast film 87 is driven by the tentering machine 100 to an extent with a predetermined amount of the residual solvent, so a polymer film 101 is delivered by the tentering machine 100. An edge slitter 102 slits away two web edge portions from the polymer film 101. A cutter blower (not shown) blows gas to the web edge portions, which are introduced to a film grinder or crusher 103. The web edge portions are ground by the film grinder or crusher 103 into polymer film chips. It is effective in view of low manufacturing cost to reuse the chips for preparing and regenerating dope. Note that the slitting step of the web edge portions may be omitted from the casting process. However, the slitting step can be preferably added at any suitable location in the sequence starting at the casting step and ending at the polymer film winding step.

While the tentering machine 100 stretches the self-supporting cast film 87, tension in the stretching direction is kept 80 N/m or more. Surface temperature of the self-supporting cast film 87 is kept equal to or higher than the glass transition temperature Tg (deg. Centigrade). Thus, orientation of the self-supporting cast film 87 in the thickness direction is relaxed. Also, the retardation Rth (nm) in the thickness direction decreases. Influence of decrease due to thermal relaxation is small with respect to the orientation in the stretching direction because of the tension in the same direction. No great change of the retardation Re (nm) in the in-plane direction does not occur because of a small decrease even upon thermal relaxation with reference to the effect of the stretching. Note that the tension is in a range equal to or more than 80 N/m and equal to or less than 5,000 N/m, and preferably in a range equal to or more than 120 N/m and equal to or less than 3,000 N/m. A surface temperature of the self-supporting cast film 87 can be determined according to the glass transition temperature Tg of the self-supporting cast film 87, and is in a range equal to or more than (Tg+1) deg. Centigrade and equal to or less than (Tg+30) deg. Centigrade, and preferably in a range equal to or more than (Tg+5) deg. Centigrade and equal to or less than (Tg+20) deg. Centigrade.

A first web of the self-supporting cast film 87 is referred to, in which the polymer is CAP and a ratio of residual solvent is equal to or more than 1 wt. % and equal to or less than 100 wt. % according to the dry base. The glass transition temperature Tg (deg. Centigrade) of the self-supporting cast film 87 before stretching in the tentering machine 100 is from −130 to 130 deg. Centigrade. The self-supporting cast film 87 is stretched in the web width direction with tension equal to or more than 100 N/m and equal to or less than 500 N/m, and stretched and dried at a temperature equal to or more than 60 deg. Centigrade and equal to or less than 145 deg. Centigrade, and for time equal to or more than 10 seconds and equal to or less than 60 seconds. As a result, the polymer film 101 is obtained. The polymer film 101 has the glass transition temperature Tg (deg. Centigrade) of 110-135 deg. Centigrade, and has the retardation value Rth (nm) in the thickness direction as small as 30-300 nm. In the polymer film 101, the retardation value Re (nm) in the in-plane direction remains in a range of 0-200 nm.

Now a second web of the self-supporting cast film 87 is referred to, in which the polymer is CAB and a ratio of residual solvent is equal to or more than 5 wt. % and equal to or less than 250 wt. % according to the dry base. The glass transition temperature Tg (deg. Centigrade) of the self-supporting cast film 87 before stretching in the tentering machine 100 is from −135 to 125 deg. Centigrade. The self-supporting cast film 87 is stretched in the web width direction with tension equal to or more than 100 N/m and equal to or less than 500 N/m, and stretched and dried at a temperature equal to or more than 60 deg. Centigrade and equal to or less than 145 deg. Centigrade, and for time equal to or more than 10 seconds and equal to or less than 60 seconds. As a result, the polymer film 101 is obtained. The polymer film 101 has the glass transition temperature Tg (deg. Centigrade) of 110-135 deg. Centigrade, and has the retardation value Rth (nm) in the thickness direction as small as 30-300 nm. In the polymer film 101, the retardation value Re (nm) in the in-plane direction remains in a range of 0-200 nm.

Cellulose esters according to the invention are advantageous in high orientation because of having any one of a propionyl group, butyryl (butanoyl) group, pentanoyl group, and hexanoyl group as substitution groups. The polymer film 101 of such a cellulose ester has the retardation value Rth (nm) in the thickness direction in a range equal to or more than 30 nm and equal to or less than 500 nm. In the polymer film 101, the retardation value Re (nm) in the in-plane direction remains in a range equal to or more than 0 nm and equal to or less than 200 nm. A ratio Rth/Re between the retardation values after the stretching is obtained in a range equal to or less than 4.0, preferably in a range equal to or more than 2.0 and equal to or less than 3.6, and desirably in a range equal to or more than 2.5 and equal to or less than 3.1. The polymer film 101 can be used as optical film in a liquid crystal display panel having a small cell gap, for example, a polarizer protecting film, optical compensation film and the like.

In the present invention, the glass transition temperature Tg (deg. Centigrade) of the self-supporting cast film 87 or the polymer film 101 is measured according to the following method. 20 mg of a sample film is place on a measuring pan of DSC (Differential Scanning Calorimetry). Then the sample is heated in a gas stream of nitrogen from 30 to 250 deg. Centigrade at a rising rate of 10 deg. Centigrade per minute. This is the 1st run. After this, the sample is cooled down to 30 deg. Centigrade at a dropping rate of −10 deg. Centigrade per minute. Then the sample is heated from 30 to 250 deg. Centigrade at a rising rate of 10 deg. Centigrade per minute again. This is the 2nd run. A result of Tg of the 2nd run is the temperature or shift from the base line to the low temperature range, this result Tg being used as the glass transition temperature.

Retardation values of the polymer film 101 is measured by use of the film roll obtained after film forming. A first retardation value Rth (nm) of the polymer film 101 in the film thickness direction is measured by cutting one portion of the polymer film 101 as a sample, conditioning the temperature and humidity for the sample, and using an automatic birefringence analyzer. A second retardation value Re (nm) of the polymer film 101 in the film in-plane direction is measured in the same manner. The process of measuring the retardation values will be described in detail with Examples of the invention.

Measurement of temperature of the self-supporting cast film 87 and the polymer film 101 according to the invention is described below. At first, films as samples are controlled with humidity of 60% RH at 25 deg. Centigrade for 24 hours. After this, the automatic birefringence analyzer KOBRA-21ADH (trade name) manufactured by Oji Scientific Instruments Co., Ltd. is used to measure a phase difference on the sample film under conditions of 25 deg. Centigrade and 60% RH. The phase difference is measured at a wavelength of 590 nm in a film vertical direction and tilted directions of a tilt angle with respect to a normal line of the film surface rotationally about a slow axis, the tilt angle being from +50 degrees to −50 degrees in a stepwise manner of 10 degrees. According to the measured values, in-plane retardation (Re) and thickness direction retardation (Rth) are calculated.

There is a drying chamber 105. A number of transport rolls 104 are contained in the drying chamber 105. The polymer film 101 is transported into the drying chamber 105. An inner temperature of the drying chamber 105 is preferably in a range of 60-145 deg. Centigrade. The polymer film 101 is transported in contact with the rolls 104 in the drying chamber 105, and is dried by gasification of the solvent. An adsorption solvent recovery device 106 is contained in the drying chamber 105. The gasified content of the solvent is adsorbed and collected by the adsorption solvent recovery device 106. Atmosphere after removal of the solvent content is caused again to flow into the drying chamber 105 as dry gas. There are preferably plural zones defined in the drying chamber 105. Temperature of dry gas for those zones is conditioned at different drying temperatures. A pre-drying chamber (not shown) is also located between the edge slitter 102 and the drying chamber 105, for drying the polymer film 101 in a preliminary manner. This is effective in suppressing changes in the shape of the polymer film 101 even upon abrupt rise in the film surface temperature.

A cooling chamber 107 receives the polymer film 101 fed into the same, and cools the polymer film 101 down to approximately the room temperature. Note than a humidity conditioning chamber (not shown) may be added between the drying chamber 105 and the cooling chamber 107. The cooling chamber 107 blows air conditioned suitably for the intended temperature and humidity. Occurrence of a curl or failure in the winding is prevented in the polymer film 101.

An electrostatic eliminator bar 108 is installed for keeping a potential of the polymer film 101 being electrified in a predetermined range, for example −3 kV from +3 kV. In the embodiment, the electrostatic eliminator bar 108 is disposed downstream from the cooling chamber 107, but may be positioned in a modified manner. Furthermore, a knurling roll 109 is preferably used to knurl web edge portions of the polymer film 101 by embossing. The knurling of the knurling roll 109 can be preferably conditioned so as to create a knurled pattern with a size of 1-200 microns in the thickness direction.

A winding roll 111 in a winding chamber 110 winds the polymer film 101 finally. It is preferable to use a press roll 112 to apply tension of a prescribed level to the rolled film. Also, the tension can be changed gradually from the start until the end of the winding. A web length of the polymer film 101 is equal to or more than 100 meters in the casting direction. The polymer film 101 has a width of 600 mm or more, preferably has a width equal to or more than 1,400 mm and equal to or less than 1,800 mm. The feature of the invention is effective also if the width is over 1,800 mm. The thickness of the polymer film may be very small according to the invention, for example a thickness equal to or more than 15 microns and equal to or less than 100 microns.

In the solution casting of the invention, the dopes 54, 59 and 64, namely two or more dopes, are cast according to simultaneous multi casting or successive multi casting. Also, those two methods of casting can be combined with one another. In FIG. 2, the casting die 71 with the feed block 70 is illustrated, which is used for the simultaneous multi casting. For the same purpose, a multi-manifold casting die can be used instead. The thickness of one of the cast films disposed on the air surface side, and/or another of them disposed on the supported side, is preferably 0.5-30% of the total thickness of the case films. Also, it is preferable in the course of the simultaneous multi casting to wrap part of high-viscosity dope with part of low-viscosity dope among the dopes 54, 59 and 64. Also, it is preferable in the course of the simultaneous multi casting to wrap part of a first selected dope with part of a second selected dope among the dopes 54, 59 and 64, the first selected dope containing a higher amount of alcohol than that of the second selected dope.

Drying according to the invention is not limited at the tentering machine 100 for the purpose of orienting and drying the polymer film 101 or the self-supporting cast film 87. For example, one or more specific rollers in the transfer assembly 90 can be rotated faster than rollers that are upstream from the specific rollers, for the purpose of applying tension to the self-supporting cast film 87 for stretching in the casting direction. Note that at the same time, the film surface temperature of the self-supporting cast film 87 is set higher than the glass transition temperature Tg (deg. Centigrade) for the purpose of stretching and drying. Thus, the retardation value Rth (nm) in the thickness direction of the polymer film 101 is obtained in a range equal to or more than 30 nm and equal to or less than 500 nm. The retardation value Re (nm) in the in-plane direction of the polymer film 101 is obtained in a range equal to or more than 0 nm and equal to or less than 200 nm. A ratio Rth/Re between the retardation values is obtained in a range equal to or less than 4.0. It is preferable to use the polymer film 101 by way of optical film in a liquid crystal display panel having a small cell gap, for example, a polarizer protecting film, optical compensation film and the like.

Furthermore, the polymer film 101 can be stretched and dried in the drying chamber 105. One or more specific rollers can be rotated faster than rollers that are upstream from the specific rollers, for the purpose of applying tension to the polymer film 101 for stretching in the casting direction. Note that at the same time, the film surface temperature of the polymer film 101 is set higher than the glass transition temperature Tg (deg. Centigrade) for the purpose of stretching and drying. Thus, the retardation value Rth (nm) in the thickness direction of the polymer film 101 is obtained in a range equal to or more than 30 nm and equal to or less than 500 nm. The retardation value Re (nm) in the in-plane direction of the polymer film 101 is obtained in a range equal to or more than 0 nm and equal to or less than 200 nm. A ratio Rth/Re between the retardation values is obtained in a range equal to or less than 4.0. It is preferable to use the polymer film 101 by way of optical film in a liquid crystal display panel having a small cell gap, for example, a polarizer protecting film, optical compensation film and the like.

In FIG. 2, three dopes are cast in a multi casting so as to facilitate creation of the polymer film 101 with desired characteristics. Specifically, incidental adhesion between surfaces of films should be prevented in winding the polymer film 101 in a roll form. To this end, a matte agent can be preferably added to the dope. Note that a drawback of the matte agent in general is a drop of a transparent characteristic or other optical characteristics. According to the embodiment, no matte agent is contained in the dope for the core layer in contrast with matte agent contained in the first and second dopes for the supported surface and air surface. This is effective in lowering the adherent property of the surfaces, and in keeping high optical characteristics.

Various methods are usable in combination to the casting of the invention, the methods including construction of the casting die, decompression chamber, support and other mechanical elements, conditioning for drying in sequential steps including the multi casting, stripping, stretching and the like, polymer film handling, winding after eliminating a curl for flatness, solvent collection, polymer film collection. Those can be used in the present invention.

A. Support of Metal for Solution Casting

Suggested in JP A 2000-84960; U.S. Pat. Nos. 2,336,310, 2,367,603, 2,492,078, 2,492,977, 2,492,978, 2,607,704, 2,739,069, 2,739,070, GB A 640731 (corresponding to U.S. Pat. No. 2,492,977), GB A 735892; JP B 45-4554, JP B 49-5614, JP A 60-176834, JP A 60-203430, and JP A 62-115035.

B. Multi Casting

Suggested in JP B 62-43846; JP A 61-158414, JP A 1-122419, JP A 11-198285; JP B 60-27562, JP A 61-94724, JP A 61-947245, JP A 61-104813, JP A 61-158413, JP A 6-134933; JP A 56-162617; JP A 61-94724, and JP A 61-94725.

C. Specific Methods of Casting of Cellulose Esters

Suggested in JP A 61-94724, JP A 61-148013, JP A 4-85011 (corresponding to U.S. Pat. No. 5,188,788), JP A 4-286611, JP A 5-185443, JP A 5-185445, JP A 6-278149, and JP A 8-207210.

D. Stretching

Suggested in JP A 62-115035, JP A 4-152125, JP A 4-284211, JP A 4-298310, and JP A 11-48271.

E. Specific Methods of Drying

Suggested in JP A 8-134336, JP A 8-259706, and JP A 8-325388.

F. Drying of Specific Controls of Heat

Suggested in JP A 2000-002809, JP A 04-001009, JP A 62-046626, and JP A 04-286611.

G. Drying in Preventing Wrinkles

Suggested in JP A 11-123732, JP A 11-138568, and JP A 2000-176950.

[Measurement of Characteristics of Polymer Film]

Various characteristics and performance of the rolled cellulose ester film and their measurement are according to suggested techniques. Those can be used in the present invention.

[Surface Processing]

At least one of the two surfaces of the cellulose ester film is preferably processed by surface processing. Examples of the surface processing include vacuum glow discharge processing, atmospheric pressure plasma discharge processing, ultraviolet radiation applying processing, corona discharge processing, flame processing, acid processing, alkali processing and the like.

[Functioning Layers]

Also, at least one of the two surfaces of the cellulose ester film can be coated with an undercoat. Various types of the undercoat can be used.

A polymer as a final product can preferably be a functioning material including the polymer film as base, and at least one other functioning layer. Examples of functioning layers include an antistatic layer, a hard resin layer, anti reflection layer, attachment facilitating layer, anti-glare layer, optical compensation layer and the like.

At least one surface active agent can be preferably included in the functioning layers in a range of 0.1-1,000 mg per sq. meter. At least one smoothing agent can be included in the functioning layers in a range of 0.1-1,000 mg per sq. meter. At least one matte agent can be included in the functioning layers in a range of 0.1-1,000 mg per sq. meter. Further, at least one antistatic agent can be included in the functioning layers in a range of 1-1,000 mg per sq. meter. Methods of adding the surface processed functioning layers to the cellulose ester film, and their various conditions are according to suggested techniques. Those can be used in the present invention.

I. Plasma Processing in General

Suggested in JP A 6-123062, JP A 11-293011, and JP A 11-5857.

II. Specific Methods of Plasma Processing

Suggested in JP A 2003-161807, JP A 2003-166063, JP A 2003-171770, JP A 2003-183836, JP A 2003-201568, and JP A 2003-201570.

III. Glow Discharge Processing

Suggested in U.S. Pat. No. 3,462,335, 3,761,299, 4,072,769, GB A 891469; JP A 59-556430; and JP B 60-16614.

IV. Ultraviolet Processing

Suggested in JP B 43-2603, JP B 43-2604, and JP B 45-3828.

V. Corona Discharge Processing

Suggested in JP B 39-12838, JP A 47-19824, JP A 48-28067, and JP A 52-42114.

VI. Matte Agents for Undercoats

Suggested in U.S. Pat. Nos. 4,142,894, and 4,396,706.

VII. Lubricants

Suggested in JP B 53-292; U.S. Pat. No. 4,275,146; JP B 58-33541, GB A 927446 (corresponding to U.S. Pat. No. 3,121,060); JP A 55-126238, JP A 58-90633; U.S. Pat. No. 3,933,516; JP A 58-50534; and European Patent Application 90108115 (corresponding to U.S. Pat. No. 5,063,147).

VIII. Polyorganosiloxanes as Lubricants

Suggested in JP B 53-292, JP B 55-49294, and JP A 60-140341.

IX. Antistatic Agents of Ionic Macromolecular Types

Suggested in JP B 49-23828, JP B 49-23827, JP B 47-28937; JP B 55-734, JP A 50-54672, JP B 59-14735, JP B 57-18175, JP B 57-18176, JP B 57-56059; JP B 53-13223, JP B 57-15376, JP B 53-45231, JP B 55-145783, JP B 55-65950, JP B 55-67746, JP B 57-11342, JP B 57-19735, JP B 58-56858, JP A 61-27853, and JP B 62-9346.

X. Polymer Films Coatable with Hard Coat Layers

Suggested in JP A 6-123806, JP A 9-113728, and JP A 9-203810.

XI. Photopolymerizable Compounds

Suggested in JP A 50-151996, JP A 50-158680; JP A 50-151997 (corresponding to U.S. Pat. No. 4,058,401), JP A 52-30899 (corresponding to U.S. Pat. No. 4,256,828), JP A 56-55420 (corresponding to U.S. Pat. No. 4,374,066), JP A 55-125105; JP A 56-8428 (corresponding to U.S. Pat. No. 4,299,938), JP A 56-149402 (corresponding to U.S. Pat. No. 4,339,567), JP A 57-192429 (corresponding to U.S. Pat. No. 4,387,216); JP B 49-17040; and U.S. Pat. No. 4,139,655.

XII. Coatings for Preventing Reflection

Suggested in JP A 7-126552, JP A 7-188582, JP A 8-48935, JP A 8-100136, JP A 9-220791, and JP A 9-272169.

[Uses]

The above-described cellulose ester film is useful particularly as a polarizer protecting film. A flat polarizer is obtained by attachment of cellulose ester films. Two polarizers are attached to a liquid crystal layers to create a liquid crystal display panel. Note that the order of the layers or films may be modified. Various examples of liquid crystal display panels are known, including TN type, STN type, VA type, OCB type, reflection type and the like. Any of those can be used in the present invention. The prior art also suggests cellulose ester film including an optical anisotropic layer, and cellulose ester film with an anti-reflection property or antiglare property. Also, the use of biaxial cellulose ester film as optical compensation film is disclosed with suitable optical characteristics. Furthermore, cellulose ester film can be used both for the optical compensation film and the polarizer protecting film. The features can be combined with the present invention. Details of those are according to various suggested techniques.

No. 1. Cellulose Ester Protective Films for Polarizers

Suggested in JP A 10-095861, JP A 10-095862, and JP A 09-113727.

No. 2. Uses of Cellulose Ester Films as High Performance Optical Elements

Suggested in JP A 2000-284124, JP A 2000-284123, and JP A 11-254466.

No. 3. Production of Cellulose Ester Films as High Performance Optical Elements

Suggested in JP A 2000-131523, JP A 06-130226, JP A 06-235819, JP A 2000-212298, and JP A 2000-204173.

No. 4. Optical Compensation Sheets

Suggested in JP A 3-9325, JP A 6-148429, JP A 8-50206, and JP A 9-26572.

No. 5. TN Type of LCD Panels

Suggested in JP A 3-9325 (corresponding to U.S. Pat. No. 5,132,147), JP A 6-148429, JP A 8-50206 (corresponding to U.S. Pat. No. 5,583,679), and JP A 9-26572 (corresponding to U.S. Pat. No. 5,855,971).

No. 6. Reflection Type of LCD Panels

Suggested in JP A 10-123478, WO 9848320 (corresponding to U.S. Pat. No. 6,791,640), JP B 3022477 (corresponding to U.S. Pat. No. 6,433,845); and WO 00-65384.

No. 7. Discotic Compounds as Coating Cellulose Ester Films

Suggested in JP A 7-267902, JP A 7-281028, and JP A 7-306317.

No. 8. Characteristics of Optical Compensation Sheets

Suggested in JP A 8-5837, JP A 7-191217, JP A 8-50206, and JP A 7-281028.

No. 9. Production of Optical Compensation Sheets

Suggested in JP A 9-73081, JP A 8-160431, and JP A 9-73016.

No. 10. Use of Cellulose Ester Films in LCD Panels

Suggested in JP A 8-95034, JP A 9-197397, and JP A 11-316378.

No. 11. LCD Elements of Guest-Host Reflection Types

Suggested in JP A 6-222350, JP A 8-36174, JP A 10-268300, JP A 10-292175, JP A 10-293301, JP A 10-311976, JP A 10-319442, JP A 10-325953, JP A 10-333138, and JP A 11-38410.

No. 12. Coating Methods

Suggested in U.S. Pat. Nos. 2,681,294; 2,761,191, 2,941,898, 3,508,947, and 3,526,528.

No. 13. Constructions of Overlaying Coatings

Suggested in JP A 8-122504, JP A 8-110401, JP A 10-300902, JP A 2002-243906, JP A 2000-111706; JP A 10-206603, and JP A 2002-243906.

No. 14. High Refractive Index Layer and Middle Refractive Index Layer

Suggested in JP A 11-295503, JP A 11-153703, JP A 2000-9908; JP A 2001-310432; JP A 2001-166104; JP A 11-153703, U.S. Pat. No. 6,210,858, JP A 2002-2776069; JP A 2000-47004, JP A 2001-315242, JP A 2001-31871, JP A 2001-296401; and JP A 2001-293818.

No. 15. Low Refractive Index Layer

Suggested in JP A 9-222503; JP A 11-38202; JP A 2001-40284; JP A 2000-284102; JP A 11-258403; JP A 58-142958, JP A 58-147483, JP A 58-147484, JP A 9-157582, JP A 11-106704; JP A 2000-117902, JP A 2001-48590, and JP A 2002-53804.

No. 16. Hard Coat Layer

Suggested in JP A 2002-144913, JP A 2000-9908, and WO 00/46617.

No. 17. Front Scattering Layer

Suggested in JP A 11-38208, JP A 2000-199809, and JP A 2002-107512.

No. 18. Antiglare Characteristic

Suggested in JP A 2000-271878; JP A 2000-281410, JP A 2000-95893, JP A 2001-100004, JP A 2001-281407; JP A 63-278839, JP A 11-183710, and JP A 2000-275401.

EXAMPLE 1

Example 1 is described now. Note that the present invention is not limited to this example. Experiment 1 will be described in detail. However, Experiments 2 and 3 and Comparisons that are Experiments 4-6 will be described mainly for their differences from Experiment 1. Their results will be indicated in Table 1.

[Material for Dopes]

100 Parts by weight of particles of cellulose triacetate (acetyl substitution degree: 1.00, propionyl substitution degree: 1.70, substitution degree as total of acyl substitution: 2.70, viscosity average degree of polymerization (DP): 260, water content: 0.2 wt. %, viscosity of 6 wt. % dichloro methane solution: 150 mPa·s, average particle diameter and standard deviation of the particle diameter: 1.5 mm and 0.4 mm);

320 parts by weight of dichloro methane, as a first solvent;
83 parts by weight of methanol, as a second solvent;
3 parts by weight of 1-butanol, as a third solvent;
7.6 parts by weight of triphenylphosphate as plasticizer A;
3.8 parts by weight of diphenylphosphate as plasticizer B.

In the cellulose acetate propionate (CAP), an amount of the residual acetic acid was 0.1 wt. % or less. An amount of the residual propionic acid was 0.1 wt. % or less. The CAP contained 60 ppm of Ca, 10 ppm of Mg, 0.2 ppm of Fe, and 65 ppm of sulfur in sulfuric acid groups. In the CAP, a degree of acetyl substitution of the 6-position was 0.32. A degree of propionyl substitution of the 6-position was 0.58. A ratio of the acetyl group and propionyl group relative to all of the acyl groups was 33%. In the CAP, an extracted amount of methanol was 5 wt. %. A ratio of the weight average molecular weight to the number average molecular weight was 2.5. In the CAP, the yellow index was 1.3. The haze was 0.08. A factor of transparency was 92.9%. The glass transition temperature Tg measured by the DSC (Differential Scanning Calorimetry) was 133 deg. Centigrade. Raw material of cellulose for the CAP was fibrous material collected from broad leaved trees.

In Experiment 3, cellulose acetate butyrate (CAB) was used. In the CAB, acetyl substitution degree: 1.00, butyryl substitution degree: 1.70, substitution degree as total of acyl substitution: 2.70, viscosity average degree of polymerization (DP): 220, water content: 0.2 wt. %, viscosity of 6 wt. % dichloro methane solution: 190 mPa·s, average particle diameter and standard deviation of the particle diameter: 1.5 mm and 0.5 mm.

In the cellulose acetate butyrate (CAB), an amount of the residual acetic acid was 0.1 wt. % or less. An amount of the residual butyric acid was 0.1 wt. % or less. The CAB contained 80 ppm of Ca, 22 ppm of Mg, 0.5 ppm of Fe, and 105 ppm of sulfur in sulfuric acid groups. In the CAB, a degree of acetyl substitution of the 6-position was 0.33. A degree of butyryl substitution of the 6-position was 0.57. A ratio of the acetyl group and butyryl group relative to all of the acyl groups was 33%. In the CAB, an extracted amount of methanol was 5 wt. %. A ratio of the weight average molecular weight to the number average molecular weight was 2.8. In the CAB, the yellow index was 1.6. The haze was 0.07. A factor of transparency was 92.9%. The glass transition temperature Tg measured by the DSC (Differential Scanning Calorimetry) was 128 deg. Centigrade. Raw material of cellulose for the CAB was fibrous material collected from cotton.

[Step 1 of Example 1: Conditioning of the Dope]

The dope producing system 10 in FIG. 1 was used. The dissolving tank or reservoir 13 of stainless steel was 4,000 liters large, and had the anchor stirrer 19 and the dissolver stirrer 21. The mixed solvent containing the above plural solvents was stored in the dissolving tank 13, and stirred and dispersed, while CAP flake or powder was added to the mixed solvent by the hopper 14, to prepare the composition with a weight of 2,000 kg. All of the solvent for use had the water content of 0.5 wt. % or less. The inside of the dissolving tank 13 was stirred for a first dispersing step by use of the dissolver stirrer 21 and the anchor stirrer 19 for 30 minutes at a prescribed shear rate, the dissolver stirrer 21 stirring at 5 m/sec as a peripheral speed for the shear rate (with stress of shear of $5 \times 10^4$ kgf/m/sec$^2$), the anchor stirrer 19 stirring at 1 m/sec as a peripheral speed for the shear rate (with stress of shear of $5 \times 10^4$ kgf/m/sec$^2$). The temperature was 25 deg. Centigrade at the start of the dispersion, and 48 deg. Centigrade at the final step of the dispersion. After the dispersion, the stirring at the high speed was stopped. The anchor stirrer 19 stirred further for 100 minutes at the peripheral speed of 0.5 m/sec, to obtain the swollen liquid 22 by swelling the CAP flake. Before the end of the swelling, the inside of the tank was pressurized with gaseous nitrogen at 0.12 MPa. The oxygen density was 2 vol. % or less, and was kept safe in view of an explosion-proof structure. A water content in the dope was 0.3 wt. %.

[Step 2 of Example 1: Dissolution and Filtration]

The swollen liquid 22 was delivered through the heater 26 from the dissolving tank or reservoir 13 by the pump 25. The heater 26 heated the swollen liquid 22 up to 50 deg. Centigrade, and further heated the swollen liquid 22 to 90 deg. Centigrade during application of pressure of 2 MPa, for complete dissolution. Time of heating in the course was 15 minutes. Then the swollen liquid 22 was cooled by the temperature adjuster 27 down to 36 deg. Centigrade, and caused to pass the filtration device 28 having a filter with a nominal pore diameter of 8 microns, to obtain dope (unconcentrated dope) with 19 wt. % of a solid content. Pressure on the primary side of the filtration was 1.5 MPa. Pressure on the secondary side of the filtration was 1.2 MPa. Elements of metal subjected to high temperature were formed from alloy with a trade name of Hastelloy, the elements including the filter, housing and conduits. The metal had high resistance to corrosion. Those elements were provided with a jacket for flow of heat exchange medium for controlling heat.

[Step 3 of Example 1: Concentration, Filtration, Defoaming and Mixing Additives]

The dope before the concentration was flushed in the flushing machine 31 conditioned at 80 deg. Centigrade with an atmospheric pressure. Solvent was gasified, and then liquefied by the condenser, and collected and separated by the solvent recovery device 32. The amount of the solid content of the flushed dope was 21.5 wt. %. The collected solvent was adjusted for preparation by the solvent regenerator 33 for reuse. A flushing tank in the flushing machine 31 included an anchor stirrer at the center. The anchor stirrer stirred the dope for eliminating bubbles by rotations at the peripheral speed of 0.5 m/sec. Temperature of the dope in the flushing tank was 25 deg. Centigrade. Average time of stay in the tank of the dope was 50 minutes. Shear viscosity of the dope at 25 deg. Centigrade was 450 Pa·s at the shear rate of 10 (/sec).

Then bubbles were eliminated from the dope by ultrasonic waves of low energy for defoaming. The pump 34 was used for the dope to flow to the filtration device 35 in a pressurized state of 1.5 MPa. In the filtration device 35, the dope was passed through a sintered fiber/metal filter with a nominal minimum pore diameter of 10 microns, and then through a sintered fiber filter with a nominal minimum pore diameter of 10 microns. For those filters, the primary pressure was respectively 1.5 and 1.2 MPa, the secondary pressure being respectively 1.0 and 0.8 MPa. The filtrated dope was conditioned at the temperature of 36 deg. Centigrade, and stored in the storing tank or reservoir 30 of stainless steel and 2,000 liters large. The dope 36 of this state is referred to herein as raw material dope. The tank 30 contained the anchor stirrer 42 at its center, and stirred the dope 36 incessantly at a peripheral speed of 0.3 m/sec. As a result, no problem of corrosion or the like occurred in portions of device elements contacting the dope in preparing the dope 36 from the dope before the concentration. Also, a mixed solvent 37 was prepared, and contained 86.5 parts by weight of dichloromethane, 13 parts by weight of acetone, and 0.5 part by weight of n-butanol.

[Step 4 of Example 1: Ejection, Addition, Casting and Decompression]

The polymer film producing system 40 in FIG. 2 was used to form polymer film. The dope 36 in the storing tank or reservoir 30 was delivered by the gear pumps 46-48 of high precision type according to feedback control of an inverter motor in such a manner as to set the pressure of a primary side at 0.8 MPa. The gear pumps 46-48 had a volume efficiency of 99.2%, and a ratio of fluctuation of 0.5% or less in the ejected amount. A pressure of ejection of the gear pumps 46-48 was 1.5 MPa.

The casting die 71 was combined with the feed block 70 which had a size of 1.8 mm in the web width direction, and was adjusted or modified for multi casting. The multi casting was constructed for three layer structure. A second polymer film formed from the core layer dope is called a core layer. A first polymer film located externally on the supported side is called a supported surface film. A second polymer film located externally on the air surface side is called an air surface film. Three conduits for the dopes were used, including the core layer dope conduit 43, the first dope conduit 44 and the second dope conduit 45.

Preparation of the core layer dope is described. UV absorbers a and b, a retardation control agent and the dope 36 were mixed with the mixed solvent 37. The UV absorbers a and b and the retardation control agent were as follows:

UV absorber a: 0.7 wt. % of 2(2'-hydroxy-3',5'-di-tert-butylphenyl) benzotriazol UV absorber b: 0.3 wt. % of 2(2'-hydroxy-3',5'-di-tert-amylphenyl) 5-chlorbenzotriazol retardation control agent: 4 wt. % of N,N'-di-meta-tolyl-N"-p-methoxyphenyl-1,3,5-triazine-2,4,6-triamine Thus, the liquid additive 51 was prepared, and poured and contained in the storing tank or reservoir 50. Also, the liquid additive 51 was delivered by the pump 52 to the dope 36 in the core layer dope conduit 43. The static mixer 53 having 78 elements was driven to mix and prepare the core layer dope 54. For addition of the substances, quantities were controlled so as to set the amount of the solid content at 21.8 wt. %, and set an amount of ultraviolet absorbers a and b at 1 wt. % in the film form, and an amount of retardation control agent at 4 wt. % in the film form.

Preparation of the first dope is described. Matte agent, a release agent and the dope 36 were dissolved or dispersed with the mixed solvent 37.

The matte agent: 0.05 wt. % of silicon dioxide with a particle diameter of 15 nm, and Mohs hardness number of approx. 7;

The release agent for facilitating stripping: 0.006 wt. % of a composition of mixture of citrate esters (citric acid, citrate monoethyl ester, citrate diethyl ester, and citrate triethyl ester).

Thus, the liquid additive 56 was prepared, and poured and contained in the storing tank or reservoir 55. Also, the liquid additive 56 was delivered by the pump 57 to the dope 36 in the first dope conduit 44. The static mixer 58 having 78 elements was driven to mix and prepare the supported surface dope or first dope 59. For addition of the substances, quantities were controlled so as to set the amount of the solid content at 20.5 wt. %, and set an amount of ultraviolet absorbers a and b at 0.05 wt. % in the film form, and an amount of retardation control agent at 4 wt. % in the film form.

Preparation of the second dope is described. the dope 36 and 0.1 part by weight of silicon dioxide were added to and dispersed with the mixed solvent 37, to prepare the liquid additive 61, which was delivered and contained in the storing tank or reservoir 60. Also, the liquid additive 61 was poured by the pump 62 to the dope 36 in the second dope conduit 45. The static mixer 63 having 78 elements was driven to mix and prepare the air surface dope or second dope 64. For addition of the substances, quantities were controlled so as to set the amount of the solid content at 20.5 wt. % and set density of matte agent at 0.1 wt. %.

The dopes 54, 59 and 64 were cast with a controlled flow rate and a web width of 1,700 mm in the casting. Those were also considered so as to obtain a product with the total thickness of 80 microns, containing the air surface layer of 4 microns, the core layer of 73 microns, and the supported surface layer of 3 microns. A jacket (not shown) was provided in combination with the casting die 71, for maintaining the heat exchange medium at the temperature 36 deg. Centigrade at an upstream end of the jacket for setting the dopes 54, 59 and 64 at 36 deg. Centigrade.

Any one of the casting die 71, the feed block 70 and the conduits were kept warm at 36 deg. Centigrade in the course of casting to form film. The casting die 71 was a coat hanger type, had thickness adjusting die bolts or heat bolts arranged at a pitch of 20 mm. The die bolts were adapted to automatic adjustment of the thickness. The die bolts are constructed to set up a profile according to a flow amount of the high-precision gear pump by a stored program, and also are capable of feedback control according to an adjusting program based on the profile of an infrared thickness meter (not shown) installed in the polymer film producing system 40. A difference between any two points which are on the polymer film and distant to one another at 50 mm was equal or less than 1 micron. The greatest difference between minimum values of the thickness in the width direction was set equal to or less than 3 microns per meter. Precision in the thickness was so determined that an average error in the thickness of the layer formed from the first and second dopes 59 and 64 was equal to or less than 2%, an average error in the thickness of the layer formed from the core layer dope 54 was equal to or less than 1%, and an average error in the total film thickness was equal to or less than 1.5%.

The decompressing chamber 81 was connected with the casting die 71 for negative pressure on the primary side. The decompressing chamber 81 was structured to create a difference in the pressure in a range of 1-5,000 Pa between two sides defined by the casting bead, and was adjustable according to the casting speed. The difference in pressure was determined so as to set a length of the casting bead at 15 mm in a tolerable range from −5 mm to +5 mm. Also, a mechanism of the decompressing chamber 81 was structured to set the chamber temperature higher than a condensation temperature of ambient gas present around the position of casting. A labyrinth packing (not shown) was disposed at least one of the two sides defined by the casting bead. Also, openings were formed in ends of the decompressing chamber 81. The decompressing chamber 81 had an edge suction device (not shown), secured to the openings, for eliminating irregularity in side edges of the casting bead.

A material of the casting die 71 was stainless steel of a type of precipitation hardening, had a coefficient of thermal expansion of $2 \times 10^{-5}$ (/deg. Centigrade) or less, and had a corrosion resistance equal to that of SUS 316 steel according to forced corrosion test in electrolytic aqueous solution. Also, the material of the casting die 71 had the corrosion resistance sufficient for prevention of pitting on the gas-liquid interface even after dipping in a liquid mixture of dichloromethane, methanol and water for three (3) months. Surfaces of the casting die 71 and the feed block 70 to contact the liquid were formed with precision to have a surface roughness of 1 micron or less, and a degree of straightness of 1 micron per meter or less in any direction. A clearance of the die slot was determined as 1.00 mm. Corner portions at the end of the die lip to contact the liquid were shaped so as to set a radius of curvature R at 50 microns or less. The shear rate inside the die was in a range of 1-5,000 (1/sec). The end of the lip of the casting die 71 was coated with a WC coating by a thermal spray process, to form a hardened layer.

The mixed solvent for imparting solubility to dopes was delivered at a rate of 0.5 ml/min per each web edge to a gas-liquid interface between an end of the bead and the die slot of the casting die 71, for the purpose of local drying and local agglutination of the dope at the slot ends. A pump for delivering the mixed solvent had a fluctuation ratio of 5% or lower. The decompressing chamber 81 decompressed for providing 150 Pa of a pressure difference by which the pressure on the rear of the bead was lower. The jacket (not shown) was connected for keeping the decompressing chamber 81 at a constant temperature. A heat exchange medium conditioned at 35 deg. Centigrade was caused to flow through the jacket. A suction device for suction of web edges was adjustable in a range of 1-100 liters per minute, and were adjusted according to the example in a range of 30-40 liters per minute in operation.

The casting support band 72 was an endless band of stainless steel, and was 2.1 meters wide and 70 meters long. A thickness of the casting support band 72 was 1.5 mm. A surface roughness of the casting support band 72 was 0.05 micron or less owing to polishing the band surface. The material of the casting support band 72 was SUS 316, and had sufficient strength and resistance to corrosion. Irregularity of the thickness of the casting support band 72 was 0.5% or less. The casting support band 72 was driven to turn by the rotating rolls 73 and 74. Tension exerted in the casting support band 72 in rotation of the rotating rolls 73 and 74 for driving was controlled and regulated at a level of $1.5 \times 10^4$ kg/m. A difference in the speed between the casting support band 72 and the rotating rolls 73 and 74 was regulated at 0.01 m/min or less. A fluctuation in the speed of the casting support band 72 was 0.5% or less. A zigzag movement of the casting support band 72 in the band width direction was limited to 1.5 mm or less during one turn of the casting support band 72. An under-die portion of the casting support band 72 directly under the casting die 71 was kept from moving beyond a range of 200 microns in a vertical direction from the end of the die lip while the rotating roll 73 rotated. The casting support band 72 was contained in the casting chamber 76 which had a mechanism (not shown) for suppressing fluctuation of gas pressure. The dopes 54, 59 and 64 were cast by the casting die 71 on to the casting support band 72 according to multi casting.

A flow conduit for a heat exchange medium was formed through the rotating rolls 73 and 74, and caused the heat exchange medium to keep the rotating rolls 73 and 74 at a target temperature by flow of the heat exchange medium at a prescribed temperature. Heat exchange medium of 5 deg. Centigrade was introduced to the rotating roll 73 on the side of the casting die 71. Heat exchange medium of 40 deg. Centigrade was introduced to the rotating roll 74 on the opposite side. Shortly before the casting, a surface temperature at the center of the casting support band 72 was 15 deg. Centigrade. A difference between the end temperatures at the end of the casting support band 72 was 6 deg. Centigrade or more. It was preferable to minimize the surface defects of the support which may be the casting support band 72 or the rotating rolls 73 and 74. Specifically, an amount of a pinhole in a size of 30 microns or more was zero. An amount of a pinhole in a size equal to or more than 10 microns and less than 30 microns was one (1) or less per sq. meter. An amount of a pinhole in a size less than 10 microns was two one (2) or less per sq. meter.

A space inside the casting chamber 76 was conditioned at 35 deg. Centigrade by the temperature adjuster 77. The cast film 80 formed from the dope cast on the casting support band 72 was dried by dry gas initially flowing in parallel. An overall heat transfer coefficient from the dry gas to the cast film 80 was 24 kcal/m$^2$.hr.(deg. Centigrade). In a space higher than the casting support band 72, flowing dry gas was conditioned at 135 deg. Centigrade upstream from the casting support band 72, and 140 deg. Centigrade downstream from the casting support band 72. Gas was blown to a lower space of the casting support band 72 for keeping 65 deg. Centigrade by the gas flow ducts 82, 83 and 84. The saturation temperature of each of the flows of the dry gas was approximately −8 deg. Centigrade. Oxygen density at the casting support band 72 in the dry atmosphere was kept at 5 vol. %. Also, gaseous nitrogen was substituted for air to keep 5 vol. % of the dry atmosphere. The condenser 78 was installed for condensing and collecting solvent in the casting chamber 76, and had an exit or downstream end conditioned at −10 deg. Centigrade.

The gas blocking panel or device 85 operated for five (5) seconds after the casting, and regulated the change in the static pressure near to the casting die 71 in a range of 1 Pa or less, by preventing the dry gas from directly striking the dope of the cast film 80. When an amount of the solvent in the cast film 80 became down to 150 wt. % according to the dry base, the stripping roller was driven to support and strip the self-supporting cast film 87 from the casting support band 72. For the purpose of suppressing failure in the stripping, a stripping speed or stripping roll draw was adjusted in a range of 100.1-110% of a speed of the casting support band 72. A film surface temperature of the self-supporting cast film 87 was measured, and found 15 deg. Centigrade. An average of a drying speed on the casting support band 72 was 60 wt. % of the solvent per minute according to the dry base of the solvent. Solvent gas was obtained by the evaporation, and condensed by the condenser 78 conditioned at −10 deg. Centigrade, and collected by the solvent recovery device 79. The collected dope was adjusted, and then reused for regeneration of the dope. Water in the solvent was conditioned with a water content of 0.5% or less. The dry gas after removal of the solvent was heated again, and reused as dry gas for blowing. The self-supporting cast film 87 was transported by the rollers in the transfer assembly 90 and to the tentering machine 100. Dry gas at 40 deg. Centigrade was blown by the blowing machine 91 to the self-supporting cast film 87.

The self-supporting cast film 87 upon entry in the tentering machine 100 was fed in the drying zones in the tentering machine 100 while retained by tenter clips on the web edges, and dried by dry gas. The tenter clips were cooled or thermally controlled by heat exchange medium of 20 deg. Centigrade by flow through the conduits in those. Tension of 550 N/m was applied to the self-supporting cast film 87 in the stretching direction of the tentering machine 100. A stretching ratio of the total in the tentering machine 100 was 30%. A chain was used to drive the tentering machine 100. Fluctuation in the speed of the sprocket of the chain was 0.5% or less. There were three (3) zones defined in the tentering machine 100. Temperature of dry gas for those zones was conditioned at respectively 100, 140 and 145 deg. Centigrade in the order in the stretching direction. Therefore, the film surface of the self-supporting cast film 87 was maintained 10 deg. Centigrade higher than the glass transition temperature Tg of the self-supporting cast film 87. The glass transition temperature Tg was measured by the DSC (Differential Scanning Calorimetry). Composition of the dry gas had saturated gas density of −10 deg. Centigrade. An average drying speed in the tentering machine 100 was 120 wt. %/min with reference to the dry base.

The drying zones were conditioned so that the amount of the residual amount of the polymer film was 7 wt. % at the downstream end of the tentering machine 100. A stretching ratio from the stripping roll 86 to the tentering machine 100, namely, tentering machine driving draw, was 102%. In relation to the stretching ratio inside the tentering machine 100, a difference in the substantial stretching ratio at a portion 10 mm or more distant from the upstream tentering end was 10% or less. A difference in the stretching ratio between any two points 20 mm distant from one another was 5% or less. A ratio of a size of the base end fixed by the tentering machine to a size being not fixed was 90%. The solvent gasified in the tentering machine 100 was condensed at the temperature of −10 deg. Centigrade into a liquid phase and collected. A condenser (not shown) was used, of which the exit or downstream end was conditioned at −8 deg. Centigrade. Furthermore, the solvent was regenerated for the reuse by adjusting the amount of its water content at 0.5 wt. % or less. Finally, the polymer film 101 was fed forwards from the tentering machine 100.

Web edges of the polymer film 101 were slitted by the edge slitter 102 within 30 seconds after moving from the tentering machine 100. An NT cutter in the edge slitter 102 cut the web edges being 50 mm wide. A cutter blower (not shown) moved the obtained web edge portions by blowing into the film grinder or crusher 103, which ground the web edge portions into chips or particles with an average area of 80 sq. mm. The chips were utilized as raw material for regeneration in producing the dope together with the CAP flake. In the dry atmosphere of the tentering machine 100, density of the oxygen was kept at 5 vol. %. To keep the density of the oxygen, gaseous nitrogen was used for substitution in air. There was a pre-drying chamber (not shown), which heated the polymer film 101 in a preliminary manner with dry gas of 100 deg. Centigrade before drying in the drying chamber 105.

The drying chamber 105 dried the polymer film 101 at a high temperature. Four zones were defined inside the drying chamber 105. Blowers (not shown) or fans caused dry gas to blow the polymer film 101 at 120, 130, 130 and 130 deg. Centigrade associated with respectively the zones. Tension applied to the polymer film 101 by the transport with the transport rolls 104 was 100 N per width. The polymer film 101 was dried for approximately 10 minutes until the amount of the residual solvent comes down to 0.3 wt. %. Wrap angles of the rolls 104 were set 90 and 180 degrees. The rolls 104 were formed from aluminum or carbon steel, and coated with a hard chrome plating. A plurality of the rolls 104 were prepared in a smoothly curved form and a matted form obtained by finish of blast. A range of shakes due to rotations of the rolls 104 was 50 microns or less. Flexure of the rolls 104 at the tension of 100 N per width was determined 0.5 mm or less.

The solvent gas contained in the dry gas was collectively removed by adsorption of the adsorption solvent recovery device 106. An agent for adsorption was activated carbon. Desorption after the absorption was made by use of dry nitrogen. The collected solvent was conditioned with water of 0.3 wt. % of water content, and was reused for dope regeneration. Various gaseous substances were contained in the dry gas, including the gaseous plasticizer, gaseous UV absorbers, and other substances with a high boiling point in addition to the solvent gas. Those gaseous substances were removed by cooling and collecting operation of a cooler and a pre-adsorber, and were reused in a circulated manner. The adsorption and desorption were conditioned so as to set the content of volatile organic compounds (VOC) equal to or less than 10 ppm in the waste gas in the outdoor environment. Note that approximately 90 wt. % of solvent was collected according to the condensing method. The remainder of the solvent was collected by the adsorption method.

A first humidity conditioning chamber (not shown) was supplied with the polymer film 101 after being dried. There was a transfer section between the drying chamber 105 and the first chamber. Dry gas of 110 deg. Centigrade was caused to flow through the transfer section. In the first chamber, air of 50 deg. Centigrade and having a dew point of 20 deg. Centigrade was caused to blow the polymer film 101. Then the polymer film 101 was transported into a second humidity conditioning chamber (not shown) for preventing occurrence of film curls. In the second chamber, air of 90 deg. Centigrade as direct temperature with humidity of 70% RH was caused to blow the polymer film 101.

After conditioning the humidity of the polymer film 101, the polymer film 101 was cooled in the cooling chamber 107 at 30 deg. Centigrade or lower, and subjected to slitting of web edge portions. While the polymer film 101 was transported, the electrostatic eliminator bar 108 electrically kept the polymer film 101 constantly in a range from −3 kV to +3 kV. Also, the knurling roll 109 knurled each of the web edge portions of the polymer film 101. The knurling was edge embossing at a width of 10 mm. A pressure for knurling was conditioned so as to obtain an average maximum height of the knurling 12 microns higher than an average thickness of the polymer film.

Then the polymer film 101 was transported into the winding chamber 110. The winding chamber 110 was kept conditioned at 28 deg. Centigrade, and 70% RH of humidity. An ion gas flow static eliminator (not shown) was combined so as to set potential of the electrified polymer film in a range from −1.5 kV to +1.5 kV. The polymer film 101 was 80 microns thick, and 1,475 mm wide. A diameter of the winding roll 111 was 169 mm. Tension was sequentially controlled, and set at 360 N per width at the initial step of the winding, and set at 250 N per width the end of the winding. The total length of the polymer film was 3,940 meters. A period of a sequence in the winding was 400 meters. A width of oscillation was from −5 mm to +5 mm. The polymer film while being wound had temperature of 25 deg. Centigrade, contained 1.4 wt. % of water, and contained 0.3 wt. % of residual solvent. An average rate of drying in the whole process was 20 wt. % per minute according to the dry base of solvent. As a result of observation, no wrinkle or looseness of the windings were found to occur. No offsetting of the windings occurred in the test of shock at 10 G. Also, appearance of the roll of the polymer film was found agreeable.

Preservation was tested. A roll of the polymer film 101 was preserved in a rack at 25 deg. Centigrade with 55% RH for one (1) month. The polymer film 101 after this was observed in the same manner as described above. No change was found as a result. No adhesions within the roll were found. No failure of stripping of the cast film 80 as a residue of the dope was found on the casting support band 72 after casting of the polymer film 101.

1. Measurement of the Retardation Value (Re) in the In-Plane Direction

The polymer film 101 was cut with an area of 70 mm×100 mm, and conditioned with humidity of 60% RH at 25 deg. Centigrade for two (2) hours. After this, the automatic birefringence analyzer KOBRA-21ADH (trade name) manufactured by Oji Scientific Instruments Co., Ltd. was used to measure the polymer film 101 at 632.8 nm in the vertical direction of the film surface, to calculate a retardation value according to the equation:

$$Re = |nMD - nTD| \times d$$

where nMD is a refractive index in the casting direction or longitudinal direction;

nTD is a refractive index in the web width direction;

d is a thickness of the polymer film 101 in nm.

2. Measurement of the Retardation Value (Rth) in the Thickness Direction

The polymer film 101 was cut with an area of 30 mm×40 mm, and conditioned with humidity of 60% RH at 25 deg. Centigrade for two (2) hours. An ellipsometer M150 (trade name) manufactured by JASCO Corporation was used to measure the polymer film 101 at 632.8 nm in the vertical direction and in a tilted state of the film surface, to calculate a retardation value according to the equation:

$$Rth = [(nMD + nTD)/2 - nTH] \times d$$

where nMD is a refractive index in the casting direction or longitudinal direction;

nTD is a refractive index in the web width direction;

nTH is a refractive index in the film thickness direction;

d is a thickness of the polymer film 101 in nm.

3. Ratio of the Retardation Values

A ratio Rth/Re between the retardation value Rth in the thickness direction and the retardation value Re in the in-plane direction was calculated. When the ratio was 4 or less, then the polymer film was found to have a considerably small retardation value Rth in the thickness direction in considering the retardation value Re in the in-plane direction.

4. Viewing Angle

A measuring device EZ-Contrast 160D (trade name) manufactured by ELDIM Corporation was used, to obtain a viewing angle, namely a range with a ratio of the contrast equal to or more than 10, according to measurement of brightness of black and white indicia. Then the viewing angle in the direction of 45 degrees of a direction angle was evaluated according to the following grades:

AA: excellent, as the viewing angle was 80 degrees or more;

A: good, as the viewing angle was 60 degrees or more and 80 degrees or less;

B: passable, as the viewing angle was 40 degrees or more and 60 degrees or less;

F: failing, as the viewing angle was 40 degrees or less.

5. Unevenness in the Display Due to Humidity dependency

A polarizer and phase difference plate were peeled from a liquid crystal TV with a display panel of the VA mode, LC-20C5 (trade name, manufactured by Sharp Corporation). A phase difference plate was prepared by use of the polymer film according to the example of the invention. Also, a commercially available polarizer HLC2-5618 (trade name, manufactured by Sanritz Corporation) not having a view angle compensation plate was prepared. The phase difference plate of the example and the available polarizer were cut at an area of 41 cm×30 cm in an orientation to set an absorption axis of the polarization in peelable with the side lines of the panel shape, and then were conditioned with humidity of 60% RH at 20 deg. Centigrade for two (2) days or more. Each of those was attached to the front and rear surfaces of the peeled liquid crystal TV. The polymer film produced according to the example was attached on the panel side. The absorption axis of the polarizer on the viewing side was directed in the panel horizontal direction. Those were oriented so as to direct the absorption axis of the polarizer on the backlight side in the panel vertical direction, and to direct the adhesive surface on the liquid crystal cell side.

Plates of the polarizers produced by the above method were attached to obtain a liquid crystal display panel. The liquid crystal TV was produced by assembling parts including the display panel. A backlight was turned on, to evaluate leak of light. To this end, the display panel in a size of 20 inches was used.

AA: Excellent, as no leak occurred at the four corners;

A: Good, as small leak occurred at any one of the four corners;

B: Passable, as recognizable leak occurred at one, two or three of the four corners;

F: Failing, as recognizable leak occurred at all the four corners;

FF: Absolutely failing, as bright leak occurred at all the four corners.

|  | Tests | Exp. 1 | Exp. 2 | Exp. 3 |
|---|---|---|---|---|
| Testing conditions | Polymer | CAP | CAP | CAB |
|  | Tension in orienting direction (N/m) | 550 | 400 | 500 |
|  | Total of oriented rate (%) | 30 | 30 | 30 |
|  | Film surface temperature (deg. C.) | +10 | +15 | +15 |
| Results | Retardation Re of in-plane direction (nm) | 70 | 70 | 65 |
|  | Retardation Rth of thickness direction (nm) | 210 | 190 | 200 |
|  | Ratio of retardation | 3 | 2.7 | 3.1 |
|  | Viewing angle | A | AA | A |
|  | Unevenness in display due to humidity dependency | A | A | A |

| | Tests | Exp. 4 | Exp. 5 | Exp. 6 |
|---|---|---|---|---|
| Testing conditions | Polymer | CAP | TAC | CAP |
| | Tension in orienting direction (N/m) | 800 | 600 | 70 |
| | Total of oriented rate (%) | 30 | 30 | 30 |
| | Film surface temperature (deg. C.) | −10 | +15 | +10 |
| Results | Retardation Re of in-plane direction (nm) | 70 | 65 | 60 |
| | Retardation Rth of thickness direction (nm) | 287 | 200 | 245 |
| | Ratio of retardation | 4.1 | 3.1 | 4.1 |
| | Viewing angle | F | A | F |
| | Unevenness in display due to humidity dependency | A | F | A |

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A solution casting process, in which dope containing a polymer and a solvent is cast on to a support to form a cast film, said cast film is stripped from said support to obtain a polymer film, and said polymer film is stretched, said solution casting process comprising a step of:

while said polymer film is stretched, applying tension of 80 N/m or more thereto in a stretching direction, wherein polymer film surface temperature thereof is set equal to or more than a glass transition temperature Tg thereof, wherein said polymer is constituted by a cellulose ester, and satisfies conditions of:

$$2.5 \leq A+B \leq 3.0 \quad \text{I}$$

$$1.25 \leq B \leq 3.0 \quad \text{II}$$

where A and B are each a degree of substitution of an acyl group formed by substituting a hydrogen atom in hydroxy groups in cellulose, and A is a degree of substitution of an acetyl group formed by substituting a hydrogen atom in said hydroxy groups in said cellulose, and B is a total degree of substitution of at least one of a propionyl group, a butyryl group, a pentanoyl group, and a hexanoyl group formed by substituting a hydrogen atom in said hydroxy groups in said cellulose.

2. A solution casting process as defined in claim 1, wherein said polymer film is stretched to have a first retardation Rth (nm) in a film thickness direction thereof, and a second retardation Re (nm) in a film in-plane direction thereof;

said first retardation Rth is equal to or more than 30 nm and equal to or less than 500 nm, said second retardation Re is more than 0 nm and equal to or less than 200 nm, and a ratio Rth/Re defined between is equal to or less than 4.0.

3. A solution casting process as defined in claim 2, wherein said tension is equal to or more than 80 N/m and equal to or less than 5,000 N/m.

4. A solution casting process as defined in claim 2, wherein said polymer film surface temperature is set equal to or more than (Tg+1) deg. Centigrade and equal to or less than (Tg+30) deg. Centigrade, where Tg is said glass transition temperature.

5. A solution casting process as defined in claim 2, wherein said cellulose ester satisfies a condition of:

$$1.3 \leq B \leq 2.97.$$

6. A solution casting process as defined in claim 1, further comprising steps of:

before stretching said polymer film, drying said polymer film stripped from said support; and after stretching said polymer film, drying said polymer film.

7. A solution casting process as defined in claim 1, further comprising a step of drying said polymer film stripped from said support, by blowing dry gas of temperature equal to or more than 20 deg. Centigrade and equal to or less than 250 deg. Centigrade thereto.

8. A solution casting process as defined in claim 1, wherein said solution casting process is according to any one of multi casting of two or more dopes at one time together for two or more cast films in said polymer film, and multi casting of two or more dopes sequentially one after another for two or more cast films in said polymer film.

9. A solution casting process as defined in claim 1, wherein said solution casting process is according to multi casting of two or more dopes at one time together for two or more cast films in said polymer film;

a thickness of one of said cast films positioned on an air surface side, and/or a thickness of one of said cast films positioned on a supported side of said support, is equal to or more than 0.5% of and equal to or less than 30% of a total thickness of said two or more cast films.

10. A solution casting process as defined in claim 1, wherein said support is a band-shaped or drum-shaped support, and a surface temperature thereof is equal to or more than −20 deg. Centigrade and equal to or less than 40 deg. Centigrade.

* * * * *